US009202182B2

(12) United States Patent
Joodi

(10) Patent No.: US 9,202,182 B2
(45) Date of Patent: Dec. 1, 2015

(54) METHOD AND SYSTEM FOR ANALYZING BUSINESS ARCHITECTURE

(75) Inventor: Pirooz M. Joodi, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 1354 days.

(21) Appl. No.: 11/203,324

(22) Filed: Aug. 11, 2005

(65) Prior Publication Data

US 2007/0038490 A1 Feb. 15, 2007

(51) Int. Cl.
*G06Q 10/00* (2012.01)
*G06Q 10/06* (2012.01)

(52) U.S. Cl.
CPC ............ *G06Q 10/06* (2013.01); *G06Q 10/0637* (2013.01); *G06Q 10/06315* (2013.01)

(58) Field of Classification Search
CPC ............................................... G06Q 10/06315
USPC ................................ 705/7.11–7.42
See application file for complete search history.

(56) References Cited

U.S. PATENT DOCUMENTS

| | | | |
|---|---|---|---|
| 5,745,878 A | 4/1998 | Hashimoto et al. | |
| 6,249,769 B1 | 6/2001 | Ruffin et al. | |
| 6,363,393 B1 | 3/2002 | Ribitzky | |
| 7,143,420 B2 * | 11/2006 | Radhakrishnan | 719/328 |
| 7,617,244 B2 * | 11/2009 | Bradley et al. | 707/104.1 |
| 2002/0103731 A1 * | 8/2002 | Barnard et al. | 705/34 |
| 2002/0194053 A1 | 12/2002 | Barrett et al. | |
| 2003/0083912 A1 * | 5/2003 | Covington et al. | 705/7 |
| 2003/0110067 A1 * | 6/2003 | Miller et al. | 705/8 |
| 2004/0002883 A1 * | 1/2004 | Andrews et al. | 705/8 |
| 2004/0117234 A1 * | 6/2004 | Lindsay-Scott et al. | 705/9 |
| 2005/0010469 A1 * | 1/2005 | Brown et al. | 705/10 |
| 2005/0209911 A1 * | 9/2005 | Burris et al. | 705/11 |
| 2006/0235733 A1 * | 10/2006 | Marks | 705/7 |
| 2007/0022410 A1 * | 1/2007 | Ban et al. | 717/136 |

OTHER PUBLICATIONS

Freeland, John G., Chapter 1: The New CRM Imperative, The Ultimate CRM Handbook: Strategies and Concepts for Building Customer Loyalty and Profitability, 2003.

* cited by examiner

*Primary Examiner* — Sujay Koneru
(74) *Attorney, Agent, or Firm* — Noah A. Sharkan; John Pivnichny

(57) ABSTRACT

A method and system is presented for defining a technique that uses business process, business activities, and data model and mapping to define a best-practice business and Information Technology (IT) blueprint to address client transformation to a new architecture. The present invention defines an eight step Business Architecture Analysis Process (BAAP) that evaluates business processes, including IT and non-IT components of a client business to create a Business Architecture Analysis (BAA) based on a fit/gap closure project list.

20 Claims, 24 Drawing Sheets

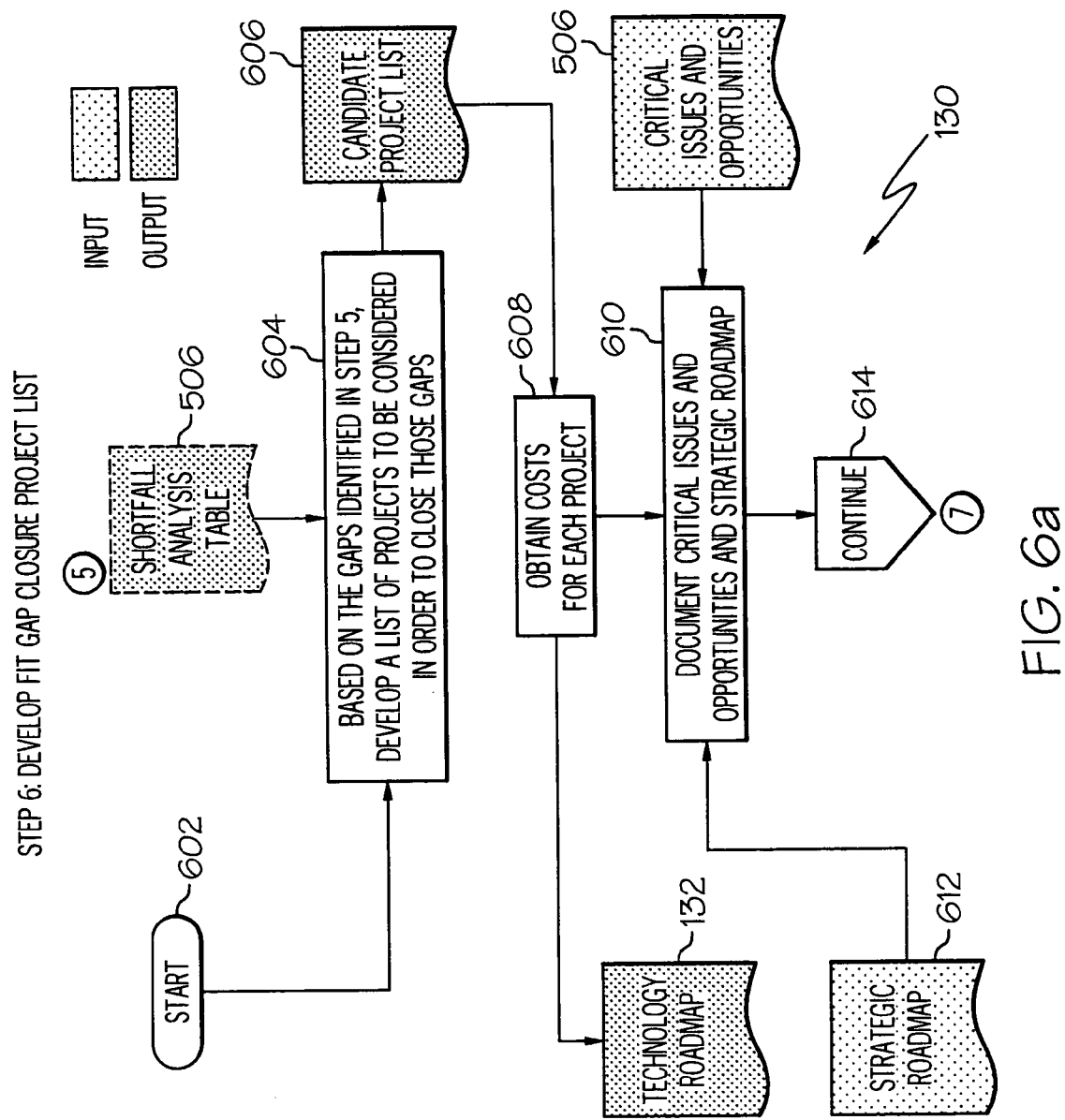

METHOD AND SYSTEM FOR ANALYZING BUSINESS ARCHITECTURE

BACKGROUND OF THE INVENTION

1. Technical Field

The present invention relates in general to the field of enterprise architecture assessment, and in particular to addressing business architecture issues. Still more particularly, the present invention relates to a universal structured approach for developing a model for each component of a particular business.

2. Description of the Related Art

Enterprises are defined as cohesive organizations, and include private and public businesses as well as governmental and educational entities. Enterprise Architecture (EA) assessments efforts are designed to evaluate the effectiveness of an enterprise's current operations and resources, and in particular its Information Technology (IT) resources, in meeting the needs and goals of that enterprise. When performed by a service consultant, these EA assessments are expected to provide a profound assessment of a customer's preliminary roadmap for technology strategy. Unfortunately, EA assessments often do not properly address essential business architecture issues, due to a lack of fundamental understanding of these issues, and due to a lack of a coherent, uniform process for evaluating an EA.

SUMMARY OF THE INVENTION

The present invention recognizes the need for a method and system to define a technique for using business process, business activities, and data model and mapping to define a best-practice business and Information Technology (IT) blueprint to address client transformation to a new architecture. The present invention defines an eight step Business Architecture Analysis Process (BAAP) that evaluates business processes, including IT and non-IT components of a client business to create a Business Architecture Analysis (BAA) based on a fit/gap closure project list.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 6a-c depict additional detail for Step 6: Develop Fit Gap Closure project list;

DETAILED DESCRIPTION OF THE PREFERRED EMBODIMENT

Figure 1A:
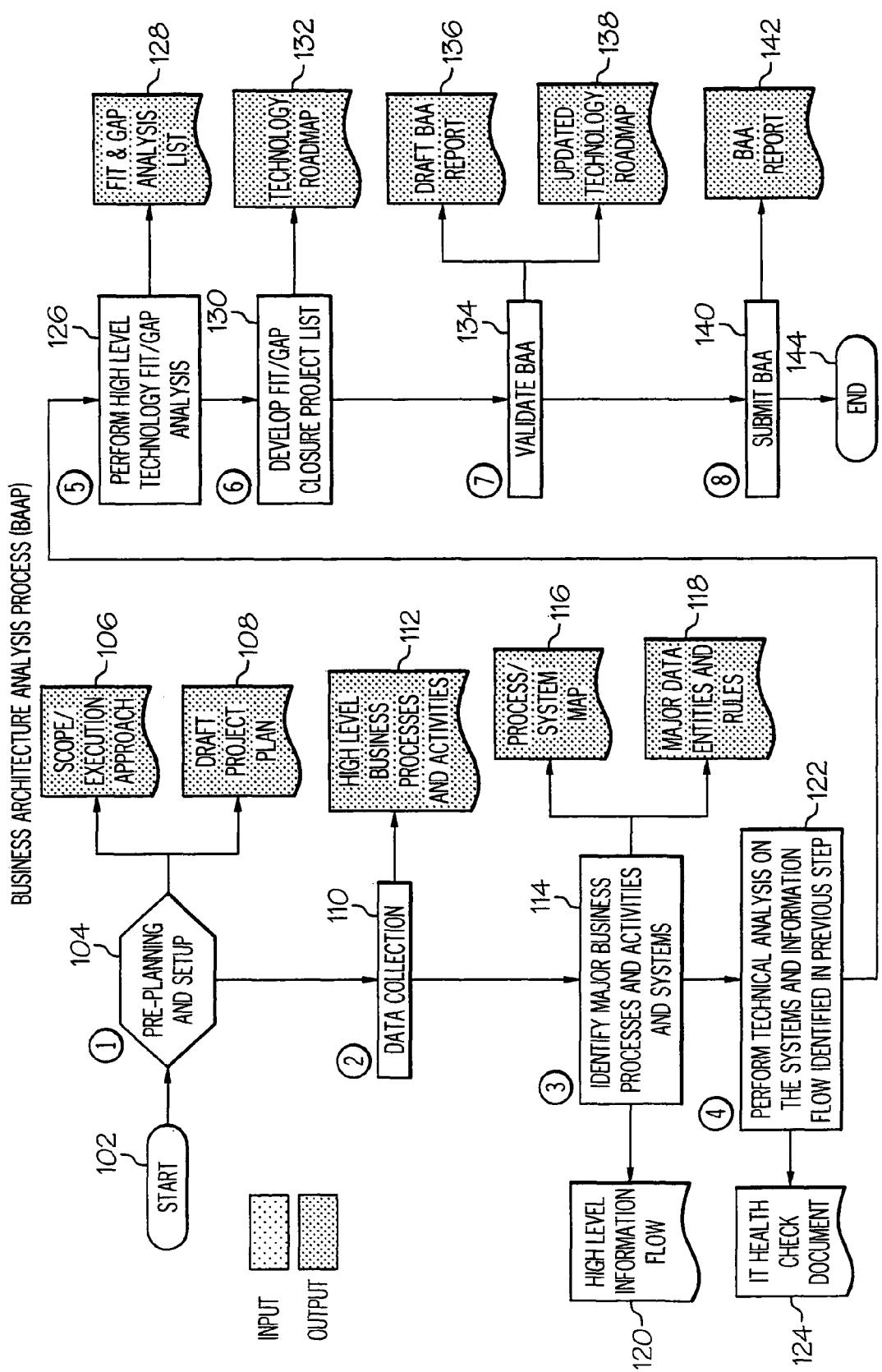
FIG. 1a depicts an overview of an inventive Eight-Step process for analyzing a business architecture.

With reference now to the figures, and in particular to FIG. 1a, an overview of a Business Architecture Process (BAAP) 100 is presented. After initiator block 102, a first step 104 (Pre-Planning and Setup) is performed, which will result in documents describing a scope 106 of BAAP 100 as well as a draft project plan 108.

After first step 104 is performed, a second step 110 (Data collection) is performed, from which a high level business processes and activities document 112 is developed. Next, a third step 114 (Identify major business processes and activities and systems) is performed, which generates a process/system map 116, a major data entities and rules document 118, and a high-level information flow document 120.

Next, a fourth step 122 (Perform technical analysis and information flow on the systems identified in the third step) is performed, which results in an Information Technology (IT) health check document 124 being generated. Next, a fifth step 126 (Perform high level technology fit/gap analysis) is performed, which generates a fit and gap analysis list 128. A sixth step 130 (Develop fit/gap closure project list) is then taken, which results in a technology roadmap 132. A seventh step 134 (Validate Business Architecture Analysis—BAA) results in the production of a draft BAA report 136 and an updated technology roadmap 138. Finally, an eighth step 140 (Submit BAA) results in a final BAA report 142, and the process ends (terminator block 144).

Figure 1B:
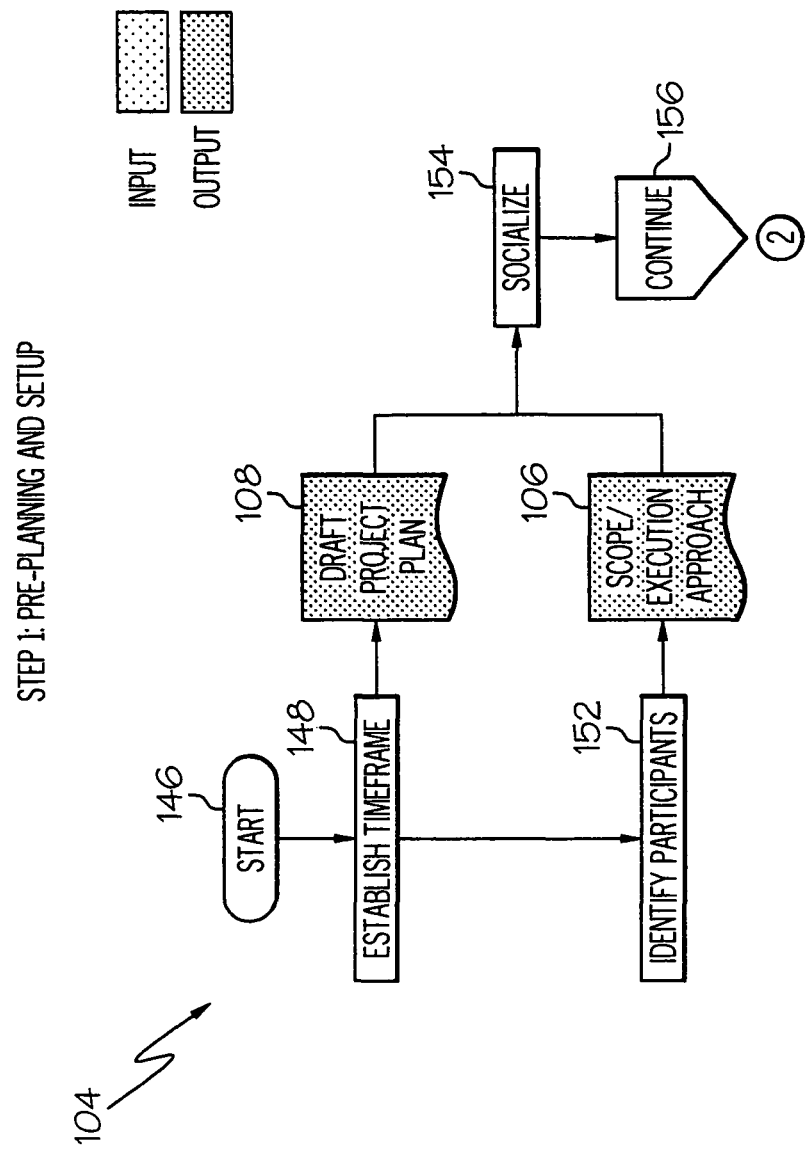
FIG. 1b illustrates additional detail for Step 1: Pre-Planning and Setup.

With reference now to FIG. 1b, additional details are discussed for first step 104 (Pre-planning and Setup). After initiator block 146, a timeframe is established for a Business Architecture Analysis Project (BAAP), as describe in block 148. With this information decided upon, the initial BAAP plan is drafted (document 108). As described at block 152, participants in the BAAP are identified, and an execution approach documents is created (document 106). Documents 108 and 106 are then presented to project participants (block 154). As shown by off-page connector 156, the process then continues to second step 110.

Figure 2:
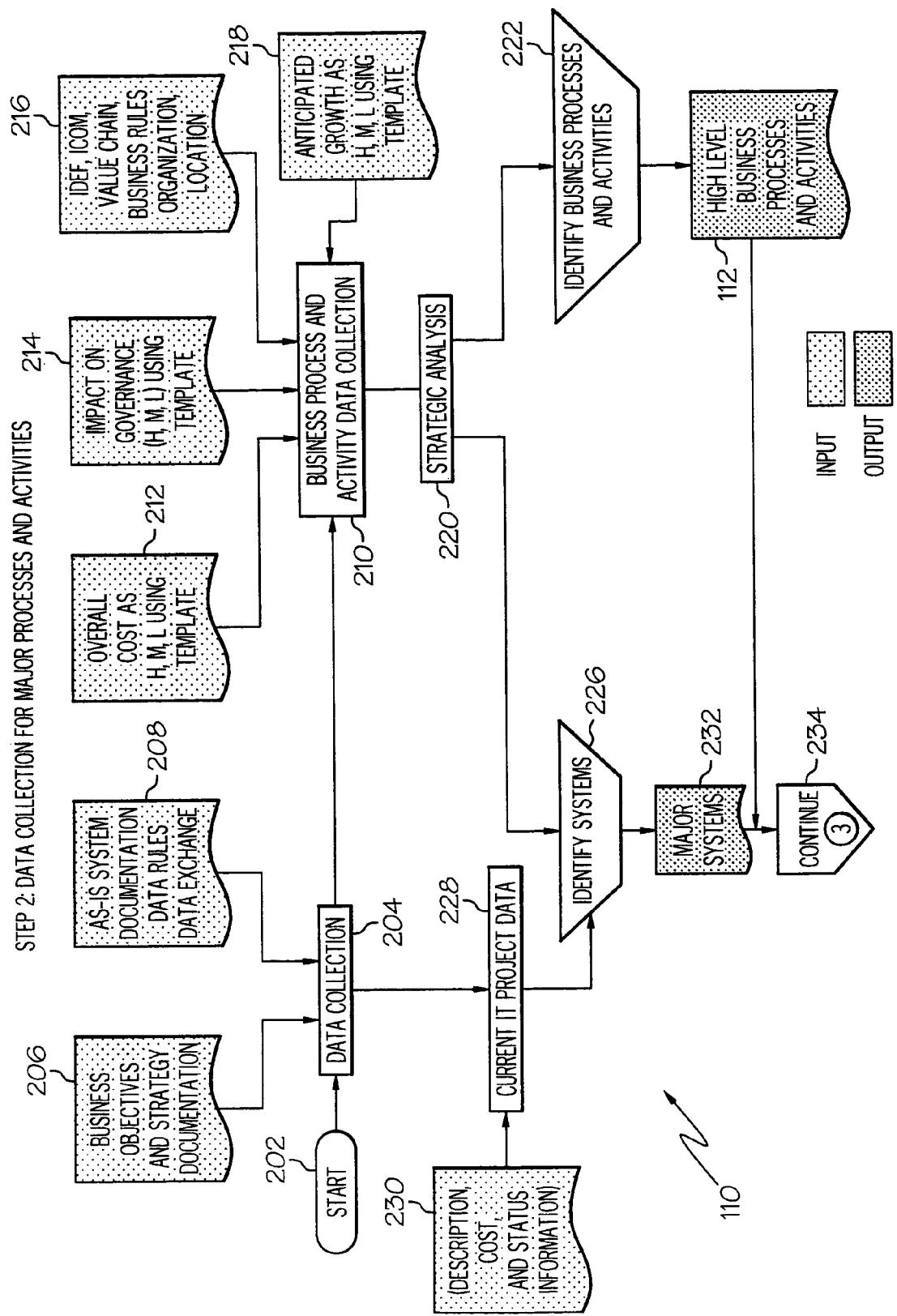
FIG. 2 depicts additional detail for Step 2: Data collection for major processes and activities.

Referring now to FIG. 2, additional detail is shown for second step 110. Starting at initiator block 202, data is collected (block 204) from document 206, which describes business objective and strategy, and from document 208, which describes as-is systems and data rules for data exchange. Document 206 includes business objectives and strategy documentation, as well as business process and activities documentation. Business processes may be evaluated based on Integrated computer-aided manufacturing (ICAM) DEFinition (IDEF), which is a group of method used to perform modeling in support of enterprise integration. IDEF may be in the form of IDEF4 (object-oriented design), IDEF2 (simulation), IDEF8 (user-interface modeling), IDEF12 (organization modeling) or IDEF14 (network design). Alternatively, the business processes may be modeled based on Inputs, Controls, Outputs, Mechanisms (ICOM). ICOM is an activity model that illustrates details of a high-level concept that shows interrelated business activities, and are preferably incorporated into the IDEF modeling protocol. The business processes may also be evaluated based on value chains, which describe value-added steps taken in a product. Examples of other notations or methodologies that may be reviewed are: Business Process Modeling Notation (BPMN); UML Activity Diagram, UML EDOC Business Processes, ebXML BPSS, Activity-Decision Flow (ADF) Diagram, RosettaNet, LOVeM, and Event-Process Chains (EPCs). Document 206 also includes business rules of a particular enterprise or a class of enterprises.

Document 208 includes eight specific areas about a specific enterprise. First, information about the business direction is provided, which includes a model for the overall business direction of the enterprise, as well as the enterprise's products, customers, suppliers, competitors and goals. The business direction addresses what the business does and why it does it.

Second, document 208 includes model information about the business process of the enterprise, which includes the enterprise's tasks, the (chronological) order of those tasks, as well as the methods, rules and results from the process. The business process addresses how the enterprise does what is does and when it does it.

Third, document 208 includes model information about the business activities, which may be based on an Activity Based Costing (ABC) model with a hierarchy of decreasing levels of abstraction. Business activities provide a view of the enterprise's activities with a hierarchy of decreasing levels of abstraction. The object of business activities is to capture all known levels of activities in which a BAAP may be interested.

Fourth, document 208 includes model information about the organization of the enterprise, which includes the structure of the enterprise's human resources, what the people in the enterprise are capable of doing (skill sets), the categories in which personnel are placed (including job titles and descriptions), and the means to improve the way personnel are organized. Organization addresses who the people in the enterprise are.

Fifth, document 208 includes model information about the locations of the enterprise, including physical location identifiers, descriptions of the types of locations, and details about specific physical facilities. That is, location describes where business takes place for the enterprise being evaluated.

Sixth, document 208 includes model information about the enterprise's systems, including software and hardware, thus providing information about what the enterprise's systems can do, how they are organized, and the way a user experiences the systems (including GUI designs). Systems thus model and describe how software supporting the enterprise processes is built, thus leading to software development.

Seventh, document 208 includes model information about the enterprise's data, which includes information stored by the enterprise, data storage rules (including security issues), and the ways in which the data is organized. That is, data addresses what the business data is, and what the business data rules of the organization are.

Eight, document 208 includes model information about the enterprise's technology, including its hardware, software, and communications tools. Technology addresses the hardware and communications used by the enterprise to support the business, and how and where this is implemented.

All of the data just described is then consolidated (block 210), along with overall costs (document 212), which includes cost information as determined for High (H), Medium (M) and Low (L) template models. Any impact on enterprise governance (including management organization) is also incorporated (document 214), as well as IDEF, ICOM, value chain, business rules, organization, location (document 216), as described above for document 208. Any anticipated growth (document 218) is also considered, preferably cost factors.

Note that data collection 204 also outputs the data collected to block 228, where any current IT projects are evaluated (along with information from document 230 describing current IT projects, including their cost and status information) along with information about current enterprise conditions.

A strategic analysis (block 220) is performed on the information in block 210. This analysis includes identifying future systems (block 226) and identifying future business processes and activities (block 222). By considering future (proposed and/or planned) systems, a document 232 describing major future systems (as well as current systems) is generated. By identifying business processes and activities (block 222), a document 112 is generated that describes high-level processes and activities. As noted at off-page connector 234, the process then continues to third step 114.

Figure 3:
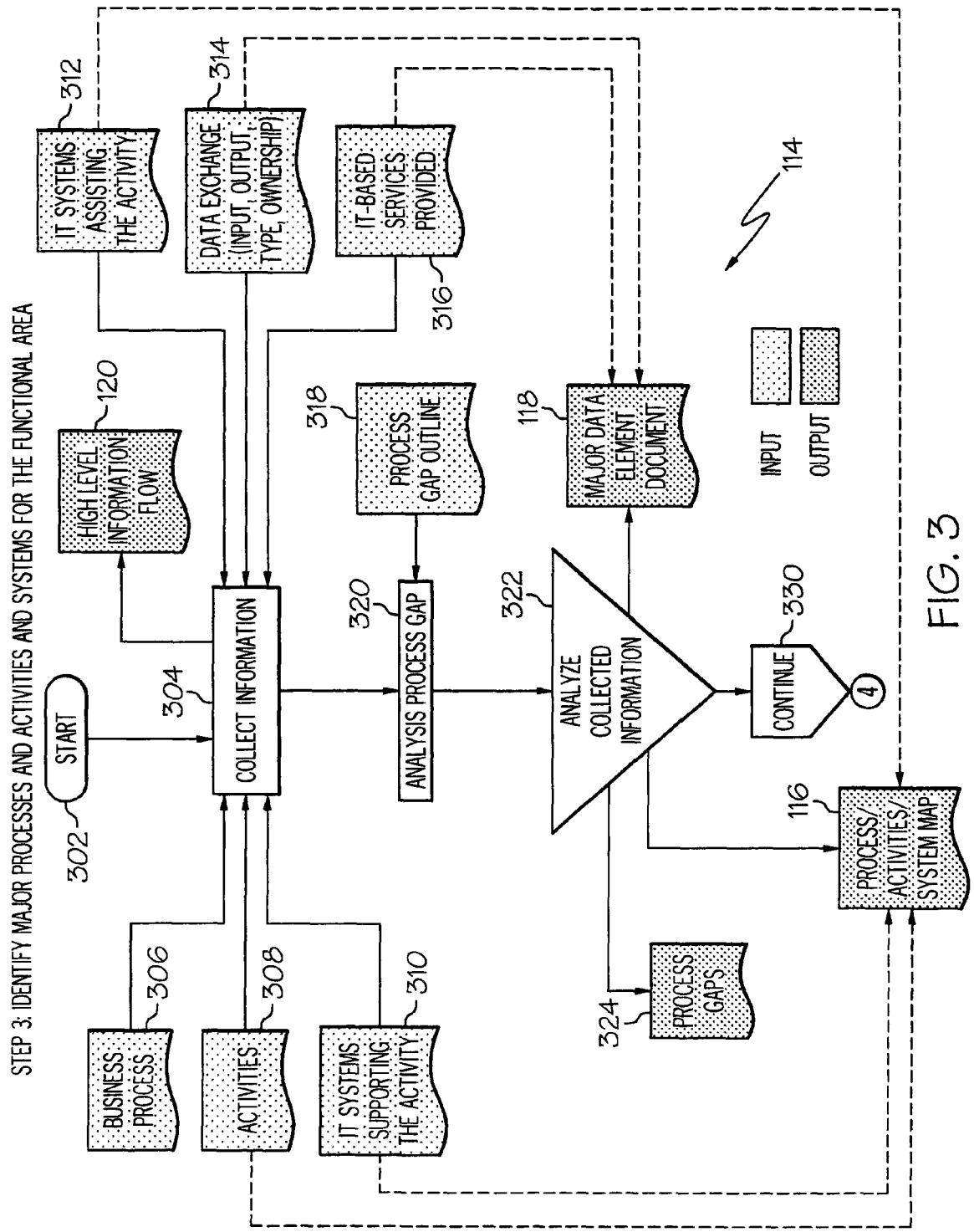
FIG. 3 illustrates additional detail for Step 3: Identify major processes and activities for the functional area.

With reference now to FIG. 3, third step 114 (Identify major processes and activities and systems for the functional area) begins at initiator block 302. At block 304, information is collected from document 306 (describing business processes of the enterprise), document 308 (activities), document 310 (IT systems supporting the enterprise's activities), document 312 (IT systems of a third-party that is assisting the activities), document 314 (data exchange between the enterprise and the third-party), and document 316 (IT-based services provided by the third-party in its role as an evaluator). These documents include information about how systems in the enterprise are to be grouped for evaluation. For example, Enterprise Resource Planning (ERP) can be used to not only determine that a software program such as SAP is being used (or is planned on being used), but also how it is being used (which components of SAP; which departments are using SAP; how is SAP inter-departmentally integrated, etc.). Also evaluated are Customer Relationship Management (CRM), which includes employment issues, adaptation to customer systems (IT as well as product delivery schedules, common carrier used, etc.), and integration (how an enterprise integrates its software and other resources with its customers). Supply Chain Management (SCM) is evaluated for fulfillment functions. Financial Management Systems (FMS), including banking and accounting systems of the enterprise, are also evaluated.

In a preferred embodiment of the present invention, information regarding the enterprise's architecture is received via a questionnaire answered by and received from the enterprise. Preferably, the questionnaire follows a format and process described in U.S. patent application Ser. No. 10/740,107, filed on Dec. 17, 2003, and herein incorporated by reference in its entirety. The questionnaire is preferably distributed to each system of grouping of systems (e.g., ERP, CRM, SCM, FMS) in the enterprise being evaluated. While the questionnaire is flexible according to the enterprise's operations and anticipated architecture, preferably the questionnaire will address at least the following fifteen elements:

(1) The business context/environment in which the enterprise architecture is implemented. Typical questions to determine this may include "What business processes, business functions (components), information, roles and locations must be addressed?" "What are the business and IT goals for the enterprise architecture?" and "What are the key users, entities and systems interacting with enterprise architecture?"

(2) The system context of enterprise architecture. Typical questions to determine this may include "What are the different types of client devices accessing the system?" and "What users/systems/entities are interacting with enterprise architecture via which channels/devices?"

(3) IT environment, process and procedures of enterprise architecture. Typical questions to determine this may include "What are the key IT roles and responsibilities?" and "How is the IT group organized?"

(4) General architecture of enterprise architecture. Typical questions to determine this may include "Have the roles of business architect, application architect and technical architect been identified and assigned to individuals with sufficient experience?" and "Have the business architecture, application architecture and technical architecture been created?"

(5) User experience for those using enterprise architecture. Typical questions to determine this may include "What are the primary user groups?" and "What are the primary user types?"

(6) Information architecture of enterprise architecture. Typical questions to determine this may include "What information needs to be made available, to whom, and how?" and "What are the language requirements for business content?"

(7) Application architecture of enterprise architecture. Typical questions to determine this may include "How do applications support the required functionality?" "What are the primary applications within enterprise architecture?" and "What are the interactions among applications, users and external entities?"

(8) Content management of enterprise architecture. Typical questions to determine this may include "What types of content, how is it maintained, published, and distributed?" "Will the content for the web pages be stored in multiple places?" and "Will the content of the web pages be managed?"

(9) Data and integration architecture of enterprise architecture. Typical questions to determine this may include "What is the enterprise data architecture?" "What are the data elements, where stored, and how are they accessed?" and "What is the current logical design of the databases?"

(10) Operational Architecture of enterprise architecture. Typical questions to determine this may include "What infrastructure do we need to provide the required Service levels?" "What are the main components of the IT environment?" and "What environments are supported for different phases?"

(11) Security architecture of enterprise architecture. Typical questions to determine this may include "What are the security and privacy requirements for the infrastructure and applications?" "What are the authentication/identification requirements for the various business processes?" and "Have the access requirements for the various data elements been identified?"

(12) Systems management of enterprise architecture. Typical questions to determine this may include "Is there an ongoing performance planning process?" and "Is there an ongoing capacity planning process?"

(13) Functional and volumetric information of enterprise architecture. Typical questions to determine this may include "Does a baseline of business volumetric information captured exist?" and "What are the current and future arrival rate of the various business sessions?"

(14) Testing of enterprise architecture. Typical questions to determine this may include "Who will perform the testing?" and "What tools will they use?"

(15) Hosting of enterprise architecture. Typical questions to determine this may include "Who is the provider?" and "Who owns the equipment?"

The questionnaire may also request information per application or system within enterprise architecture. For example, the customer's IT staff may be requested to identify the access channels per user type, the total number of users, etc. In any event, it should be understood that the questions cited above are not intended as an exhaustive list of questions. Rather, they are cited herein only to illustrate the possible types of questions that can be posed.

As a result of the steps taken in block 304, document 120 (describing the high-level information flow of the enterprise being evaluated) is created.

A document 318 includes a process gap outline that provides an outline for determining which processes being evaluated are inadequate (having a gap between what it in place and what is or will be needed now and/or in the future). The information collected in the process described in block 304 is applied to document 318 in block 320 to generate a process gap for the enterprise, which is then analyzed in block 322. From this analysis, a document 324 describing the process gaps is generated. Also generated, along with input from document 308 and document 310, is the process/system map 116, which provides a graphical representation of the processes and systems used by the enterprise. Similarly, the steps taken by block 322 generate, along with input from documents 314 and 316, major data entities and rules document 118, which describes the IT system and protocols used by the enterprise being evaluated.

Figure 4:
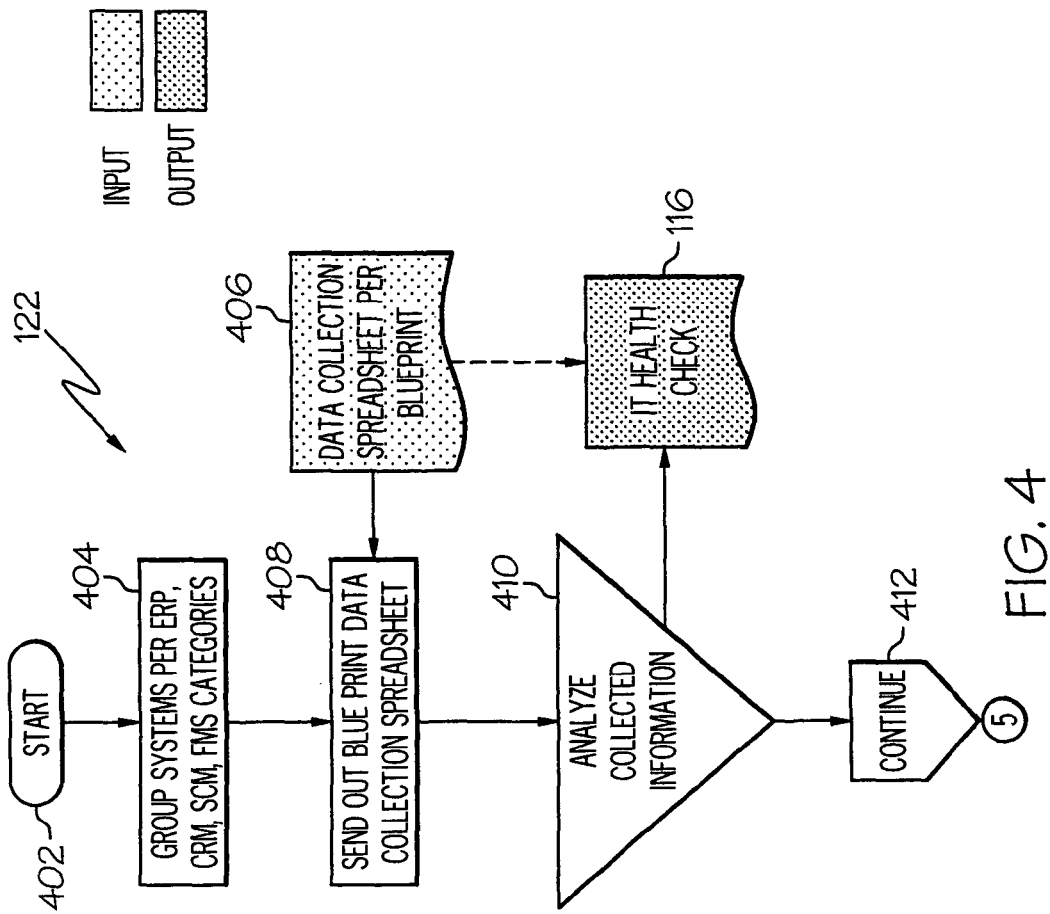
FIG. 4 depicts additional detail for Step 4: Perform technical analysis on the systems identified in previous step.

As shown by off-page connector 330, the process then continues to the fourth step 122 (Perform technical analysis on the systems and information flow identified in the third step). Referring now to FIG. 4, fourth step 122 being with initiator block 402, after which the enterprise's systems are grouped per the ERP, CRM, SCM and FMS categories described above (block 404). Using input from a document 406 (data collection spreadsheet, preferably based on the questionnaire described above), a blueprint data collection spreadsheet is sent to an evaluator after being completed by the enterprise being evaluated (block 408). The information in the spreadsheet is then evaluated (block 410) to determine the current state of systems being evaluated. This evaluation results in document 116, describing the IT health of the enterprise (which can alternatively be directly created from document 406 if document 406 includes an inherent evaluation). As shown at off-page connector 412, the process then continues to fifth step 126.

Figure 5A:
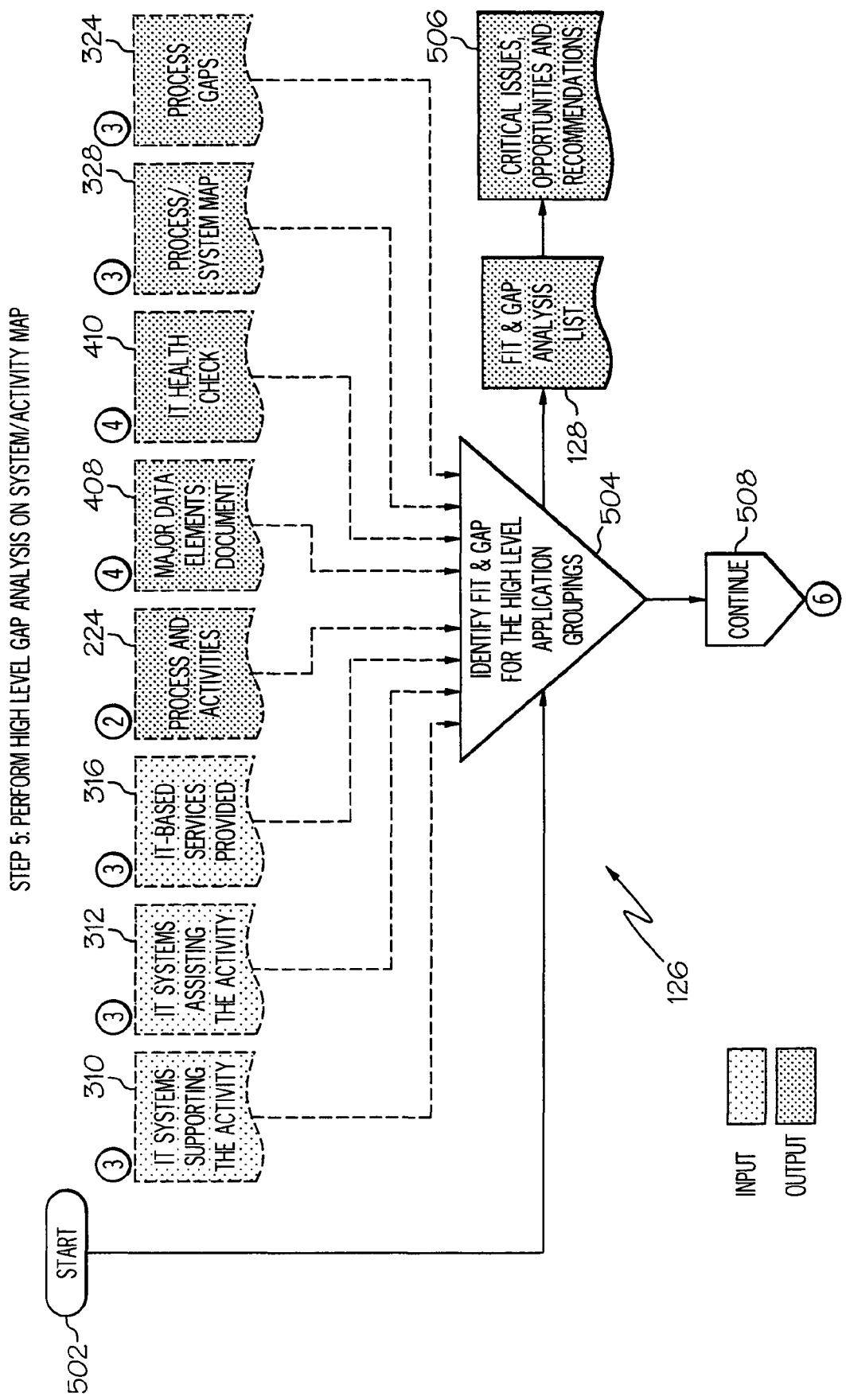
FIGS. 5a-c illustrate additional detail, for Step 5: Perform high level gap analysis on System/Activity map.

With reference now to FIG. 5a, fifth step 126 begins at initiator block 502. At block 504, the high level application groupings (e.g., ERP, CRM, SCM, FMS) have their fit and gaps identified to determine where shortfalls lie (particularly in the IT departments). This evaluation is performed based on input from documents 310, 312, 316, 224, 408, 410, 328, and 324 described above. The process shown in block 504 includes performing a high-level technology gap analysis on the process/system map provided in document 328 in a "deep dive" data mining and evaluation. Collected data is analyzed and summarized from the IT health check given in document 410.

Figure 5B:
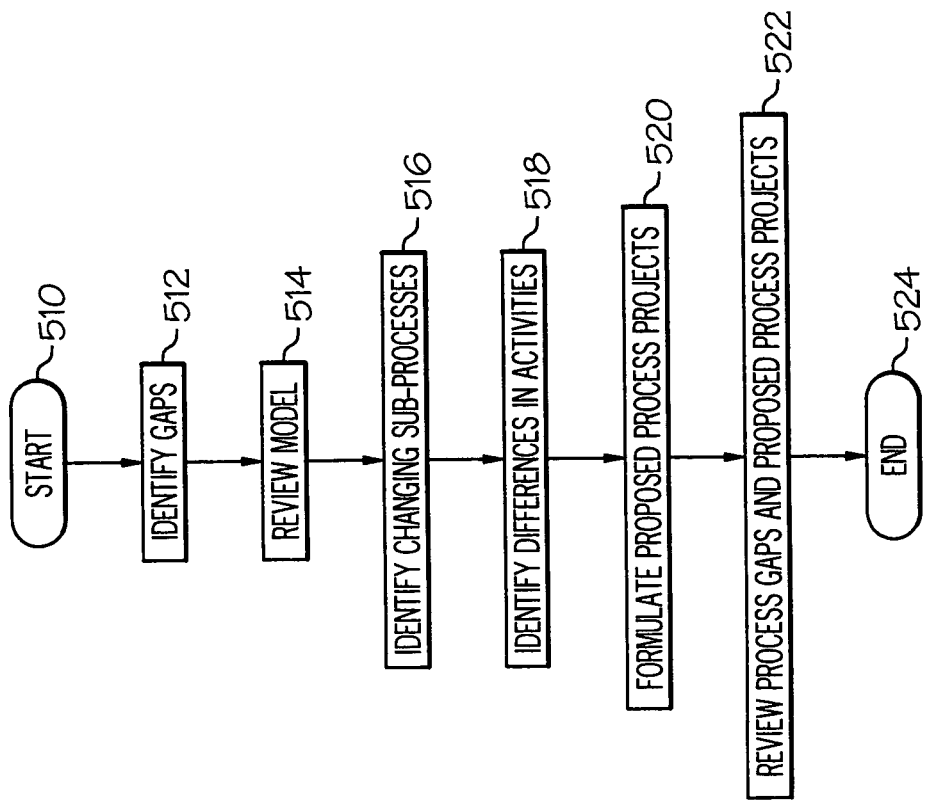

The process shown in block 504 drafting the shortfall analysis table 128 based on a process gap assessment. As shown in FIG. 5b, after initiator block 510, the first step (block 512) is to identify the differences (gaps) between the current process(es) and the future process(es). The level at which the analysis must begin will depend on the level of change being introduced. In radical re-engineering engagements, whole processes may disappear. However for projects involving technology enabling an existing process, the process and sub-process definitions will remain the same, with changes occurring only at the activity level.

Next, a review of the highest-level process model within the scope of the engagement is performed by comparing the current and future states and identifying any processes that will be removed or introduced (block 514). Next, any sub-processes that will be removed or introduced are identified (block 516).

Next, a review of the activity level process maps of the current sub-process and the future sub-process is performed, and differences in activities are identified (block 518). This will involve both differences in the activities from a procedural perspective as well as differences in the systems to be used and in the job roles who perform the activities.

Having identified the gaps, process projects are formulated to move from the current to the future state (block 520). For each proposed process projects, as assessment needs to be made of: 1) the resources required; 2) the costs; 3) the risks (this could be impacted by/dependent on other projects planned or in progress that are not in the scope of the engagement); and 4) whether there are any changes that can be made immediately to gain quick benefit with low cost (i.e., quick wins). Proposed process projects obviously have dependencies on organization and technology—so the dependencies need to be understood and the projects grouped into releases.

As shown in block 522, the process gaps and proposed projects are then reviewed and verified by representatives from both the business and IT management, for completeness, feasibility and to gain commitment to go-ahead with the recommendations. Changes in the business processes, particularly involving new technologies, usually mean a change in IT processes as well. The process then ends at terminator block 524.

From the gap analysis assessment described in FIG. 5b, a document 506 is created, which is a draft of critical issues, opportunities and recommendations to the enterprise being evaluated. The development of the critical issues and opportunities work product is an iterative process that begins with the initial phases of an engagement and is completed when the final deliverables are provided to the customer. Following are some specific suggestions of sources and methods for aggregating, documenting and sharing the deliverables.

1. Capturing Issues and Opportunities

Figure 5C:
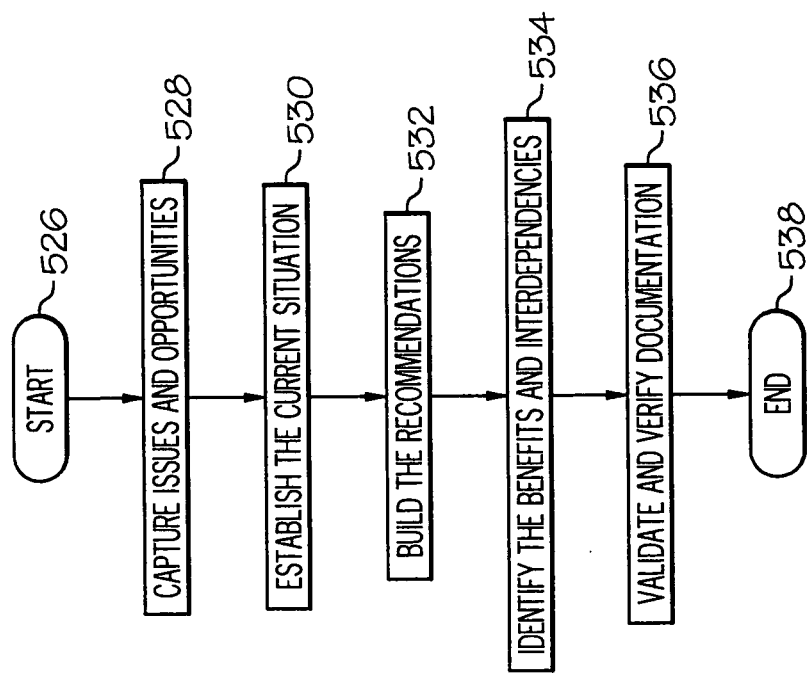

With reference now to FIG. 5c, after initiator block 526, issues and opportunities are captured (block 528).

Issues

Start with the proposal/scope of work that was used to sell the engagement. Many of the client's critical issues will be stated there and should be extracted verbatim, if possible, to test for client understanding and concurrence. Begin a list of critical issues now and continue to add to it as the engagement activities are performed and the work products prepared.

Review the highlights or summaries of stakeholder interviews. Identify key issues and which stakeholder(s) raised them. Make particular note of issues that are commonly mentioned and those that are mentioned only by a particular stakeholder or group of stakeholders. Add incremental issues to the list and/or restate proposal issues in client terms.

Review the outputs and proceeding from any client workshops that have been conducted. Identify the proposal and/or shareholder issues that were re-enforced by workshop participants. In particular, identify new issues that surfaced from the perspective of workshop participants and their source(s). Add new issues to the growing list, noting their source (discretely, if necessary).

Review customer inputs from satisfaction surveys, complaint records, wants and needs studies and customer relationship visits. Identify and list issues from the client's customers' perspective. State these issues in the customers' terminology whenever possible. Add them to the list. At this point it may be possible to begin to compare and contrast the client's internal view with their customers' or the public's external view.

Finally, review the issues that the consulting team used as a basis for creating their hypotheses. Hopefully, there will be a close fit with the most critical or pervasive issues on your list so far. If not, the consulting Principal and Engagement Manager should be advised so the project can be realigned with the true issues.

Document the aggregated issues in a format that communicates how pervasively they are held and by whom, as well as their perceived relative importance to the client.

Review the reports and selected proceedings of other Work Products in the investigative phase, paying particular attention to analyses of the client's current business processes, organization and information systems. Analyze the current process maps to identify problem areas in the operational processes and also in how knowledge is managed.

Opportunities

Look for specific characteristics or root causes that contribute to the client's critical issues. Look objectively for constraints to solving critical client issues and ideas or opportunities that surfaced during the investigative phase. Begin a list of "opportunity areas" to be used as input to the redesign activities to follow.

If "best practice" research or process benchmarking has been performed, it should have yielded some important insights into how other companies inside and outside of the client's industry have solved similar issues. These can be powerful and compelling additions to your list of opportunities, because they confirm the "art of the possible" with significantly better business results.

Return to the customer inputs and if available, summarize those things that the client's customer wants/needs/expects from the client that are not being sufficiently provided today. When given the opportunity, client's customers will often suggest or prescribe practical solutions that become useful focus areas for redesign.

Summarize areas where there are opportunities to leverage new technologies, for example e-business, not only to fix existing problems, but also to change the ways of working. These may have been identified from a technology scan, client interviews and workshops or discussions with IBM technical groups.

Document the aggregated list of opportunity areas in a format that communicates their alignment with critical issues and identifies their source by category. Specific quotes from customers, competitors and workshop participants can carry much weight if presented discretely.

2. Establishing the Current Situation

Moving on to block 530, as the metrics around the process maps are developed and data gathered through out the project, they should be applied to the identified issues and opportunities. Representing the issues and opportunities in quantifiable terms presents a powerful impetus to the organization to take action.

Quantifiable data would be obtained from metrics around process maps such as cycle times, wait times, internal performance indicators, industry benchmarks, and volume analysis. If an activity based costing analysis has been conducted, it would provide most of the information needed to support the issues and opportunities and develop quantifiable benefits of the recommendations.

3. Building the Recommendation

Moving now to block 532, the recommendations to address the critical issues and take advantage of opportunities will be identified at various stages in the engagement. Some will be identified early in the engagement. For example, in workshops to analyze the root causes of process problem areas there are often many root causes (that may relate to product/service offerings, policies, processes, data, organization structure skills, applications, technology etc.) Similarly, from workshops to brainstorm solutions/opportunities for improvement there are often many suggestions . . . particularly with technologies as an opportunity to conduct the business differently. Out of these workshops it is possible to classify the problems/root causes as having a low, medium, high impact on the customer (satisfaction), business (strategy), employee (satisfaction), business partner (satisfaction), etc. It is also possible to classify the ideas/opportunities according to whether they have a low, medium or high cost to implement; and whether they have a low, medium or high benefit to the business. It is essential that these problems/opportunities be prioritized/classified in some way, including potential "quick wins", and that recommendations are provided to the client. Seeking early feedback from senior management will ensure that the inputs to the future process design are in line with the needs of the business (e.g. adopting a new technology that requires major investment should be agreed prior to designing the process).

The majority of recommendations will be developed during the later stages of an engagement and will typically include recommendations on the design of the future process, the introduction of new technologies/systems and changes to the organization. In developing recommendations, there are often several options available. The options should all be considered and the 'best' option for this client situation recommended. The criteria for determining which to recommend will vary from one engagement to another, but will include factors such as relative cost/risk/other planned or ongoing initiatives. Any constraints need to be identified, and the risks articulated (risk assessment) and managed (risk mitigation). While developing recommendations, the critical issues and opportunities provide a reference point on the areas that must be addressed.

4. Identifying the Benefits and Interdependencies

As described in block 534, each set of issues, opportunities and recommendations should be supported by a distinct set of benefits. Again, these provide the impetus to the organization to take action. Depending upon the stage of the project this section could be supported with quantified benefits (always preferred) or state the qualitative improvement that would result by implementing the recommendations. They must be focused on the objectives identified by management as the purpose of the engagement effort. Where possible they should address: 1) Effects on cost; 2) Effect on customer Value; 3) Effects on effort of implementation (cost, time, risk); and 4) Effects on other parts of the organization.

The interdependency section identifies the relationships between different recommendations. It highlights the effect that not implementing one recommendation would have on the level of benefit the organization would receive from other recommendations. If the engagement effort spans across organizational units, this section would identify impact points across the organization.

5. Validation and Verification

As described in block 536, a draft of the documentation is presented to the workshop participants for verification. Revisions should be made as necessary and the updated documentation then made available to the project sponsor and all project team members for future reference. The process then ends at terminator block 538.

Returning to FIG. 5a, fifth step 126 concludes with off-page terminator 508, which leads to sixth step 130, shown in FIG. 6a. After initiator block 602, sixth step 130 develops a list of projects to be considered in order to close gaps identified in fifth step 126 (block 604, using input from document 506). A document 606, showing a list of candidate projects to be considered for closing these gaps, is generated. Cost for each project are obtained (block 608) to create document 132 (technology roadmap).

As shown in block 610, critical issues and opportunities and strategic roadmap is documented based on inputs from document 506 and newly created document 612 providing a strategic roadmap of processes to be concentrated on based on previous steps taken.

Portfolio Level Strategic Roadmap

Figure 6B:
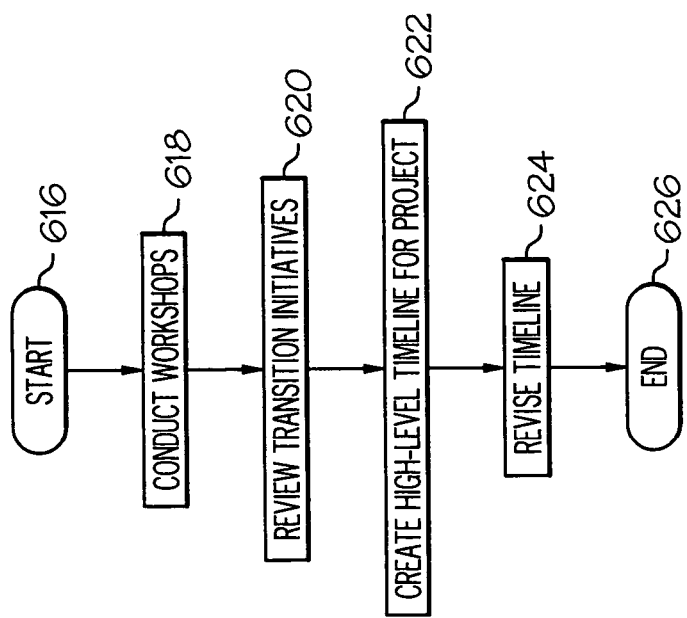

As shown in FIG. 6b, document 612 can be created at a portfolio level (high-level for entire enterprise). After initiator block 616, workshops and work sessions are conducted with participants from a core team and other individuals (extended team members) who are knowledgeable about the areas being pursued (block 618). As shown at block 620, transition initiatives are reviewed to identify dependencies (critical path, interdependencies) and other factors for phasing or timeline development. At block 622, a high-level timeline, including appropriate phasing of initiatives based upon previously identified dependencies and factors, is created. The timeline is then revised (block 624) based upon considerations and implications from business justifications, and the process ends (terminator block 626).

Initiative Level Roadmap

Figure 6C:
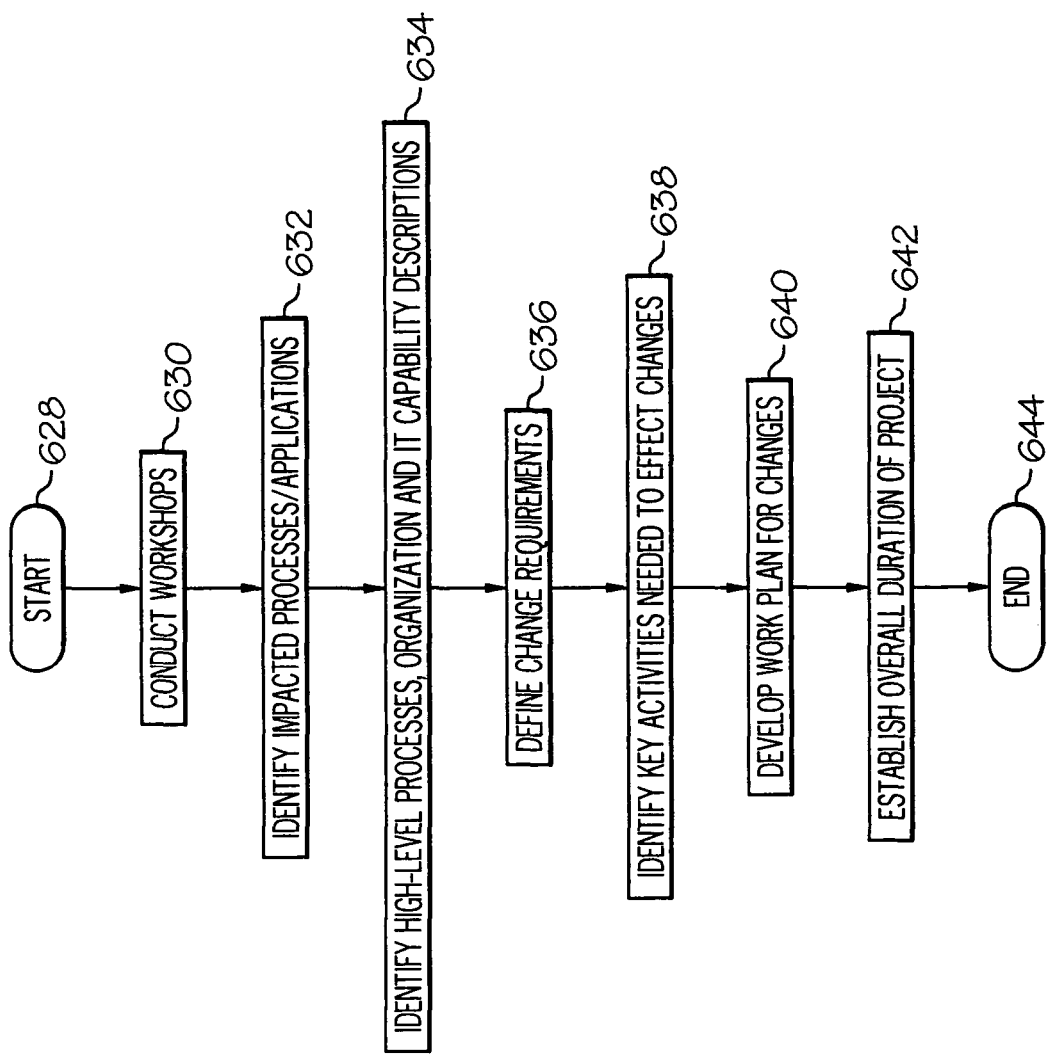

As shown in FIG. 6c, document 612 can include steps taken at an initiative level (at a lower department or sub-organization level). After initiator block 628, workshops and work sessions with participants from the core team are conducted (block 630). Using previously completed Transition Initiatives work product content, impacted processes/applications are identified, as well as new/incremental content and functional requirements (block 632). Next, an identification is made of high-level processes, organization and IT capability descriptions that serve as design points for new business and IT architecture and infrastructure (block 634). A definition is created, at a high-level, of the process, content, organization and IT change requirements needed to position the enterprise to support and enable the initiative (block 636). For each change requirement, an identification is made of the key activities needed to effect the change, along with an estimate of the time needed (duration), and associated dependencies (block 638). Using key activities and implications identified previously, a work plan is developed that depicts the individual activities and timing (based upon the estimated duration, interdependencies, etc.), as shown at block 640. In addition, the overall duration for the initiative is established and documented (block 642), and the process ends (terminator block 644). Note that multiple projects may be suitable based upon the size and complexity of the initiative, and/or the areas affected.

Figure 7:
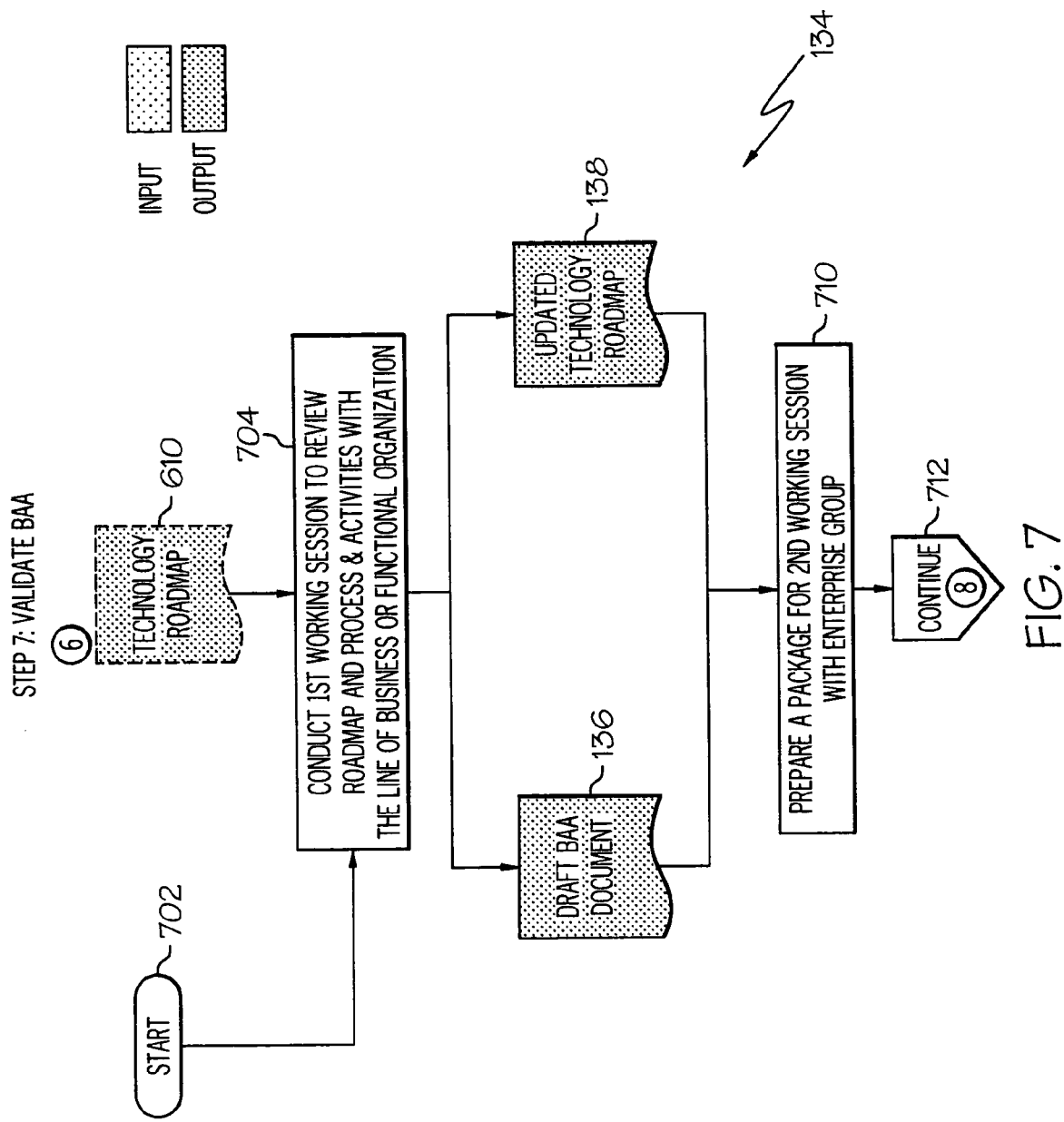
FIG. 7 illustrates additional detail for Step 7: Validate Business Architecture Analysis (BAA)

Returning now to FIG. 6a, as shown at off-page connector 614, the process then continues with seventh step 134, as described in further detail in FIG. 7. After initiator block 702, a first working session is conducted to review roadmap and process and activities for each line of business or functional organization (block 704), using, inter alia, document 610. The process shown in block 704 results in the generation of documents 136 and 138. Document 136 includes a draft of a Business Architecture Analysis (BAA), while document 138 includes an updated technology roadmap. From these two documents, a package is prepared for a second working session with the enterprise group (block 710), and the process then continues to eight step 140, as shown by off-page connector 712. The revisions are made by reviewing and updating the processes described above for creating the initial drafts of these documents.

Figure 8:
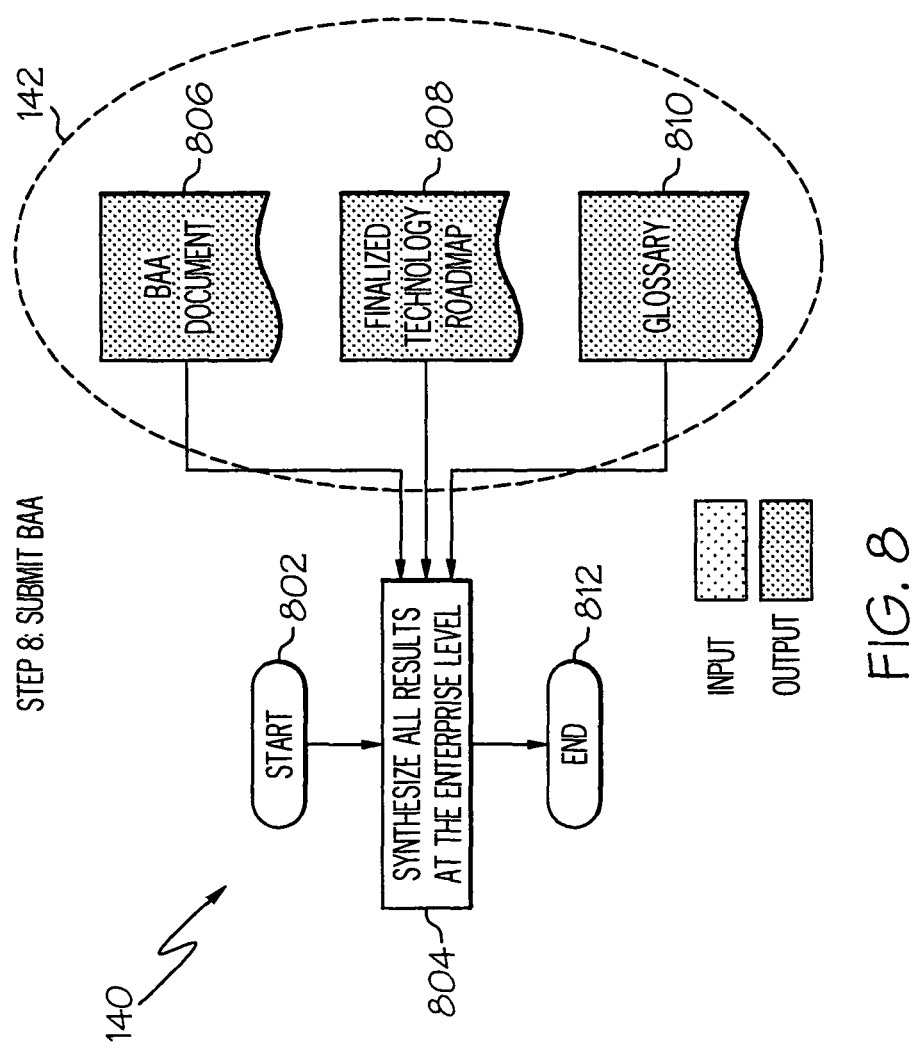
FIG. 8 depicts additional detail for Step 8: Submit BAA.

Referring now to FIG. 8, eighth step 140 begins with initiator block 802, after which all results at the enterprise level are synthesized (block 804). This leads to the creation of the final BAA report 142, which includes a final BAA document 806, a final technology roadmap 808, and a glossary 810 for documents 806 and roadmap 808. The process then ends at terminator block 812.

Figure 9:
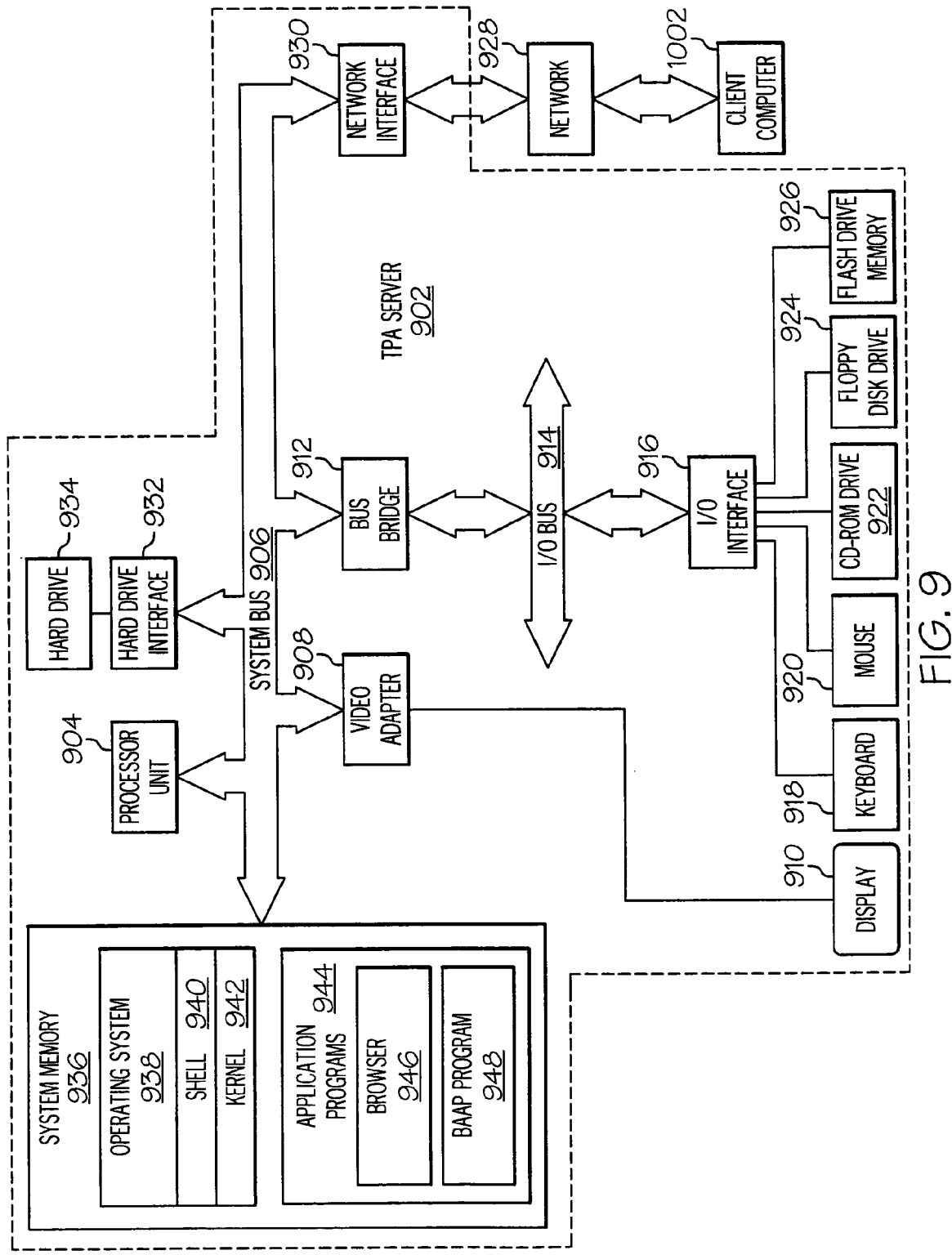
FIG. 9 illustrates an exemplary server that can be used to deploy software for executing the steps described in FIGS. 1-8.

With reference now to FIG. 9, there is depicted a block diagram of an exemplary Third Party Administrator (service provider) server 902 that can be used to process and/or send to a client computer 1002 a BAAP program 948, which performs the functions described above in FIGS. 1-8. TPA server 902 includes a processor unit 904 coupled to a system bus 906. Also coupled to system bus 906 is a video adapter 908, which drives/supports a display 910. System bus 906 is coupled via a bus bridge 912 to an Input/Output (I/O) bus 914. Coupled to I/O bus 914 is an I/O interface 916, which affords communication with various I/O devices, including a keyboard 918, a mouse 920, a Compact Disk-Read Only Memory (CD-ROM) drive 922, a floppy disk drive 924, and a flash drive memory 926. The format of the ports connected to I/O interface 916 may be any known to those skilled in the art of computer architecture, including but not limited to Universal Serial Bus (USB) ports.

TPA server 902 is able to communicate with a client computer 1002 via a network 928 using a network interface 930, which is coupled to system bus 906. Preferably, network 928 is the Internet.

Also coupled to system bus 906 is a hard drive interface 932, which interfaces with a hard drive 934. In a preferred embodiment, hard drive 934 populates a system memory 936, which is also coupled to system bus 906. Data that populates system memory 936 includes TPA server 902's operating system 938, which includes a command interpreter program known as a shell 940, which is incorporated in a higher level operating system layer and utilized for providing transparent user access to resources such as application programs 944, which include a browser 946, a Business Architecture Analysis Program (BAAP) 948.

As is well known in the art, a command interpreter or "shell" is generally a program that provides an interpreter and interfaces between the user and the operating system. More specifically, a shell program executes commands that are entered into a command line user interface or from a file.

The shell (UNIX) or command processor (Windows) is generally the highest level of the operating system software hierarchy and serves as a command interpreter. The shell typically provides a system prompt, interprets commands entered by keyboard, mouse, or other user input media, and sends the interpreted command(s) to the appropriate lower levels of the operating system (e.g. a kernel 942) for processing.

Exemplary application programs 944 used in the present invention are web browser 946 and BAAP 948. Web browser 946 includes program modules and instructions enabling a World Wide Web (WWW) client (i.e., client computer 1002) to send and receive network messages to the Internet using HyperText Transfer Protocol (HTTP) messaging. BAAP 948 performs the steps described in detail in the figures and description provided above, as well as Graphical User Interfaces (GUIs) associated with the described process.

The hardware elements depicted in TPA server 902 are not intended to be exhaustive, but rather are representative to highlight essential components required by the present invention. For instance, TPA server 902 may include alternate memory storage devices such as magnetic cassettes, Digital Versatile Disks (DVDs), Bernoulli cartridges, and the like. These and other variations are intended to be within the spirit and scope of the present invention.

Figure 10:
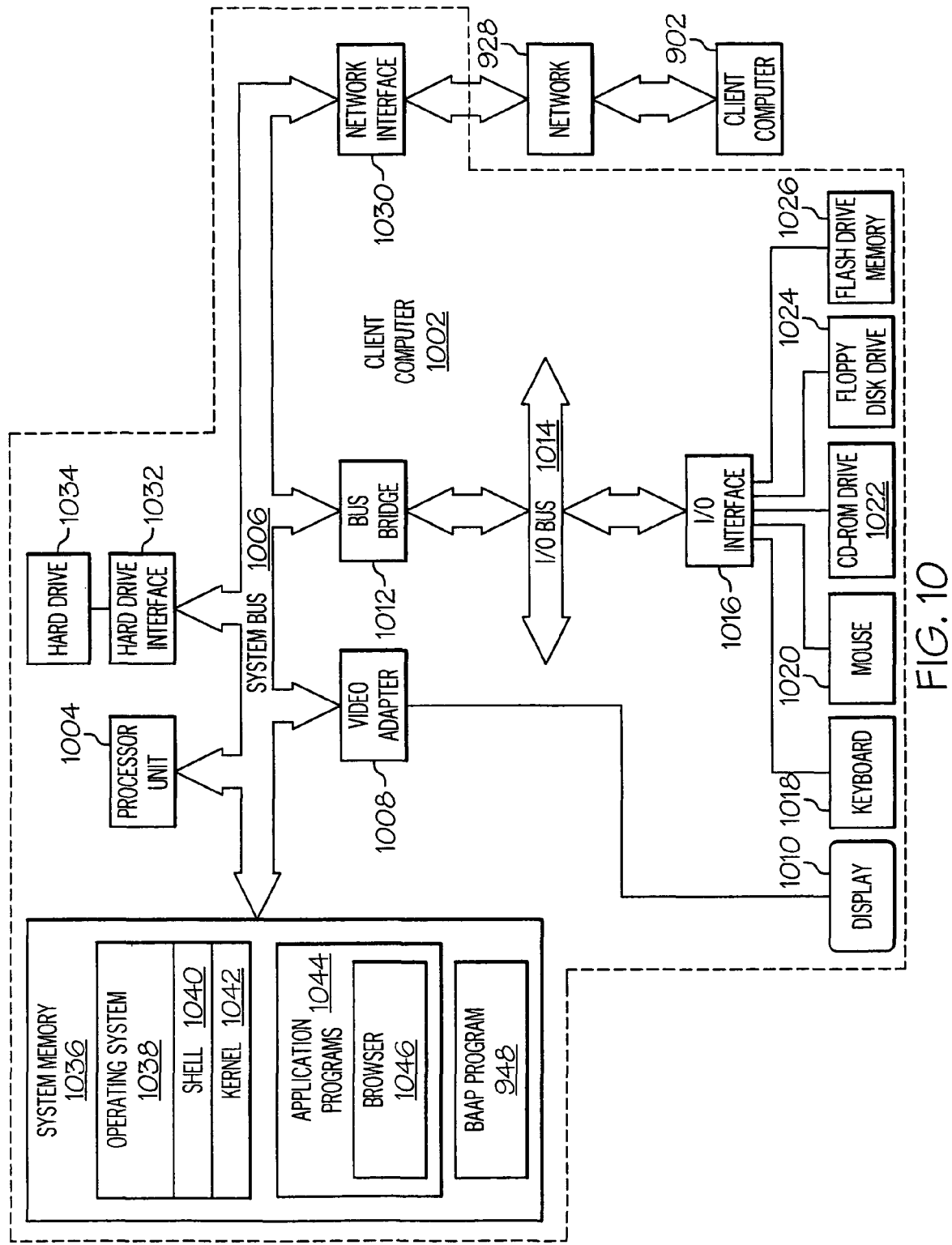
FIG. 10 depicts an exemplary client computer that can be used to execute software for executing the steps described in FIGS. 1-8.

With reference now to FIG. 10, there is depicted a block diagram of an exemplary client computer 1002, which is an exemplary computer for either a client (enterprise) of a third party administrator (service provider) or the service provider itself. Client computer 1002 includes a processor unit 1004 coupled to a system bus 1006. Also coupled to system bus 1006 is a video adapter 1008, which drives/supports a display 1010. System bus 1006 is coupled via a bus bridge 1012 to an Input/Output (I/O) bus 1014. Coupled to I/O bus 1014 is an I/O interface 1016, which affords communication with various I/O devices, including a keyboard 1018, a mouse 1020, a Compact Disk-Read Only Memory (CD-ROM) drive 1022, a floppy disk drive 1024, and a flash drive memory 1026. The format of the ports connected to I/O interface 1016 may be any known to those skilled in the art of computer architecture, including but not limited to Universal Serial Bus (USB) ports.

Client computer 1002 is able to communicate with TPA server 902 via network 928 using a network interface 1030, which is coupled to system bus 1006.

Also coupled to system bus 1006 is a hard drive interface 1032, which interfaces with a hard drive 1034. In a preferred embodiment, hard drive 1034 populates a system memory 1036, which is also coupled to system bus 1006. Data that populates system memory 1036 includes client computer 1002's operating system 1038, which includes a shell 1040 and a kernel 1042, for providing transparent user access to resources such as application programs 1044, which include a browser 1046. Optionally, client computer 1002's system memory 1036 may include the BAAP 948 described above.

The hardware elements depicted in client computer 1002 are not intended to be exhaustive, but rather are representative to highlight essential components required by the present invention. For instance, client computer 1002 may include alternate memory storage devices such as magnetic cassettes, Digital Versatile Disks (DVDs), Bernoulli cartridges, and the like. These and other variations are intended to be within the spirit and scope of the present invention.

It should be understood that at least some aspects of the present invention may alternatively be implemented in a computer-readable medium (preferably tangible) that contains a program product capable of executing the above described steps. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Figure 11A:
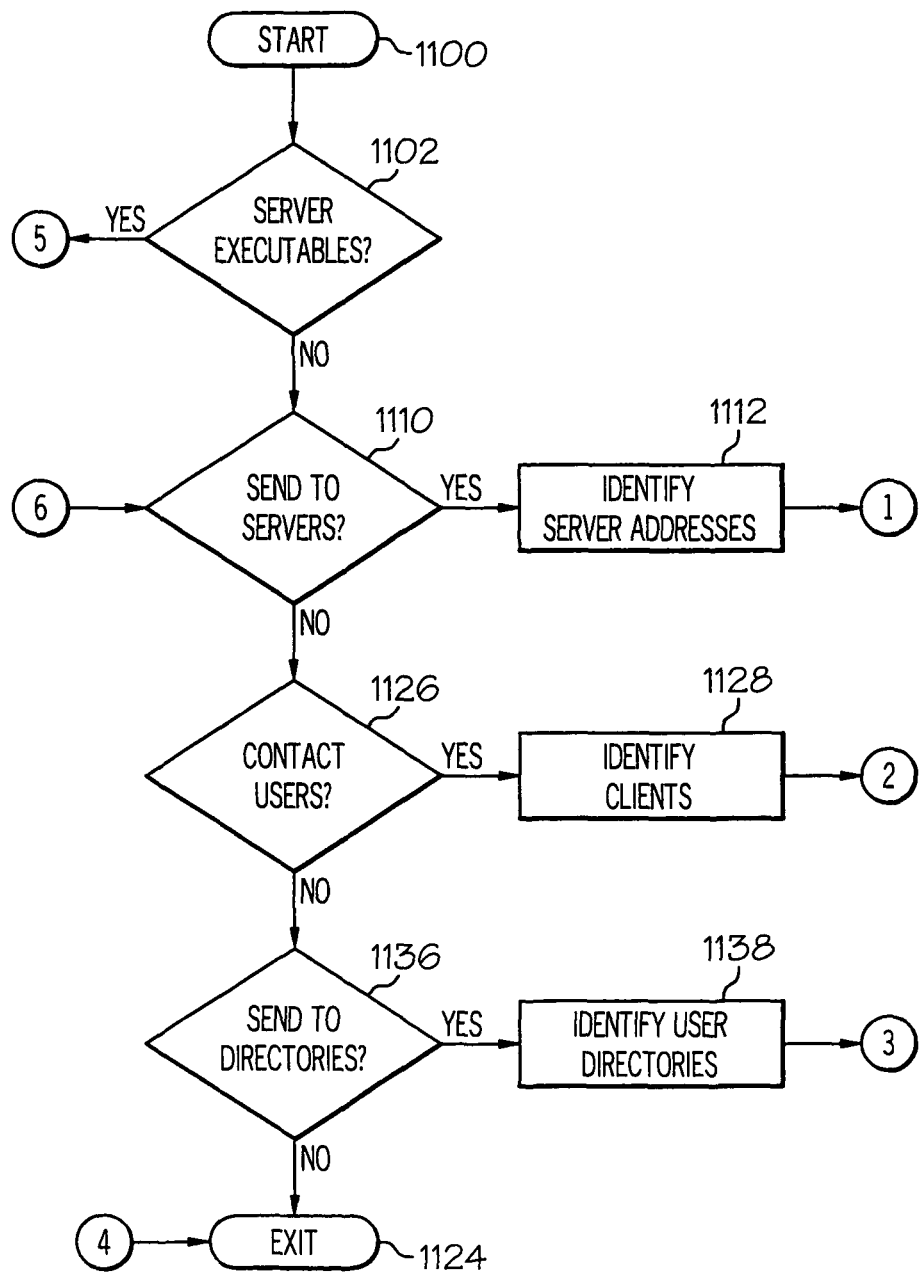
FIGS. 11a-b show a flow-chart of steps taken to deploy software capable of executing the steps shown in FIGS. 1-8.
Figure 11B:
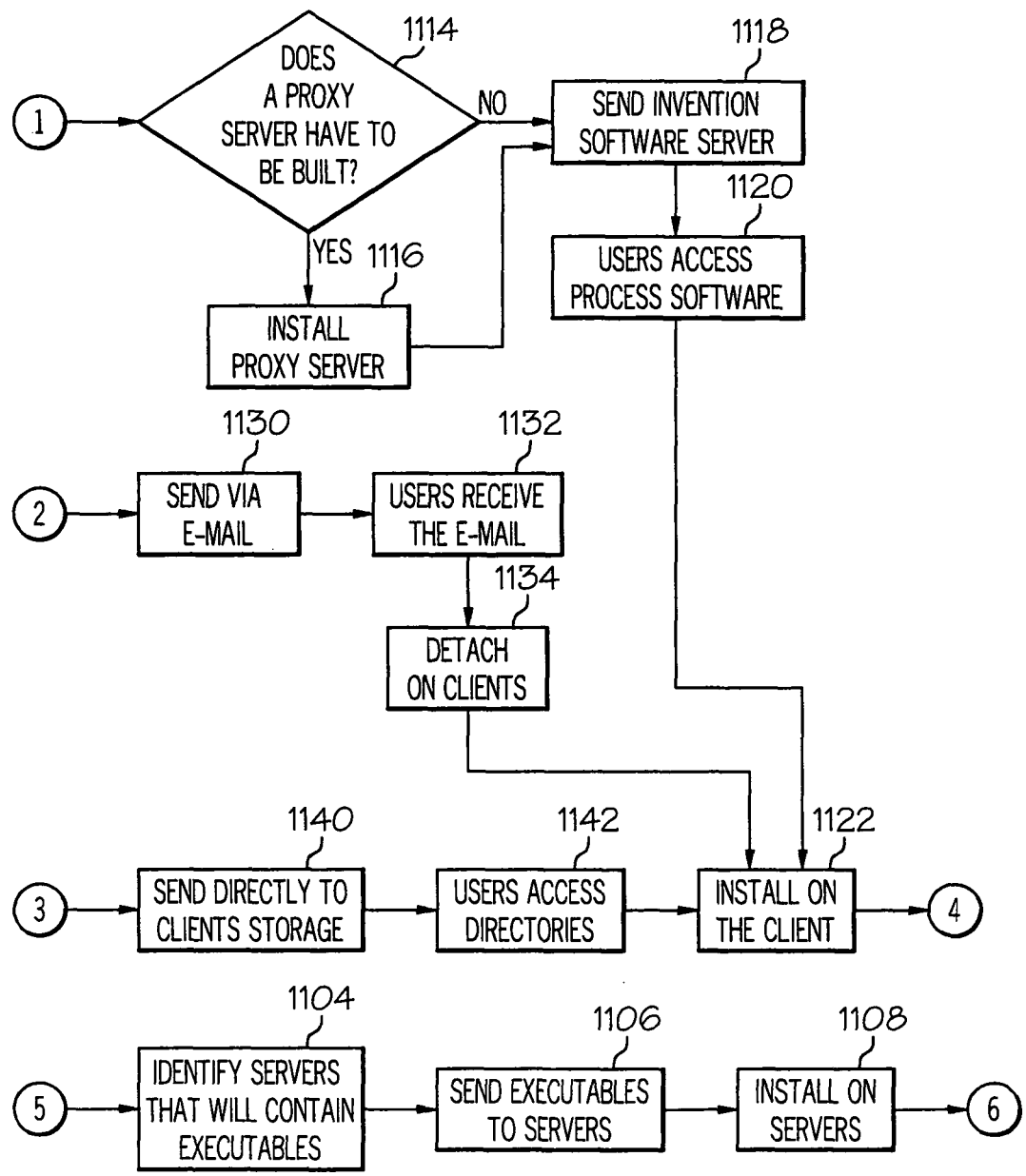

Thus, the method described herein, and in particular as shown in FIGS. 1-8, can be deployed as a process software. Referring now to FIGS. 11a-b, step 1100 begins the deployment of the process software. The first thing is to determine if there are any programs that will reside on a server or servers when the process software is executed (query block 1102). If this is the case, then the servers that will contain the executables are identified (block 1104). The process software for the server or servers is transferred directly to the servers' storage via File Transfer Protocol (FTP) or some other protocol or by copying though the use of a shared file system (block 1106). The process software is then installed on the servers (block 1108).

Next, a determination is made on whether the process software is be deployed by having users access the process software on a server or servers (query block 1110). If the users are to access the process software on servers, then the server addresses that will store the process software are identified (block 1112).

A determination is made if a proxy server is to be built (query block 1114) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 1118). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 1120). Another embodiment is to have the servers automatically copy the process software to each client and then run the installation program for the process software at each client computer. The user executes the program that installs the process software on his client computer (block 1122) then exits the process (terminator block 1124).

In query step 1126, a determination is made whether the process software is to be deployed by sending the process software to users via e-mail. The set of users where the process software will be deployed are identified together with the addresses of the user client computers (block 1128). The process software is sent via e-mail to each of the users' client computers (block 1130). The users then receive the e-mail (block 1132) and then detach the process software from the e-mail to a directory on their client computers (block 1134). The user executes the program that installs the process software on his client computer (block 1122) then exits the process (terminator block 1124).

Lastly a determination is made on whether to the process software will be sent directly to user directories on their client computers (query block 1136). If so, the user directories are identified (block 1138). The process software is transferred directly to the user's client computer directory (block 1140). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 1142). The user executes the program that installs the process software on his client computer (block 1122) and then exits the process (terminator block 1124).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 12A:
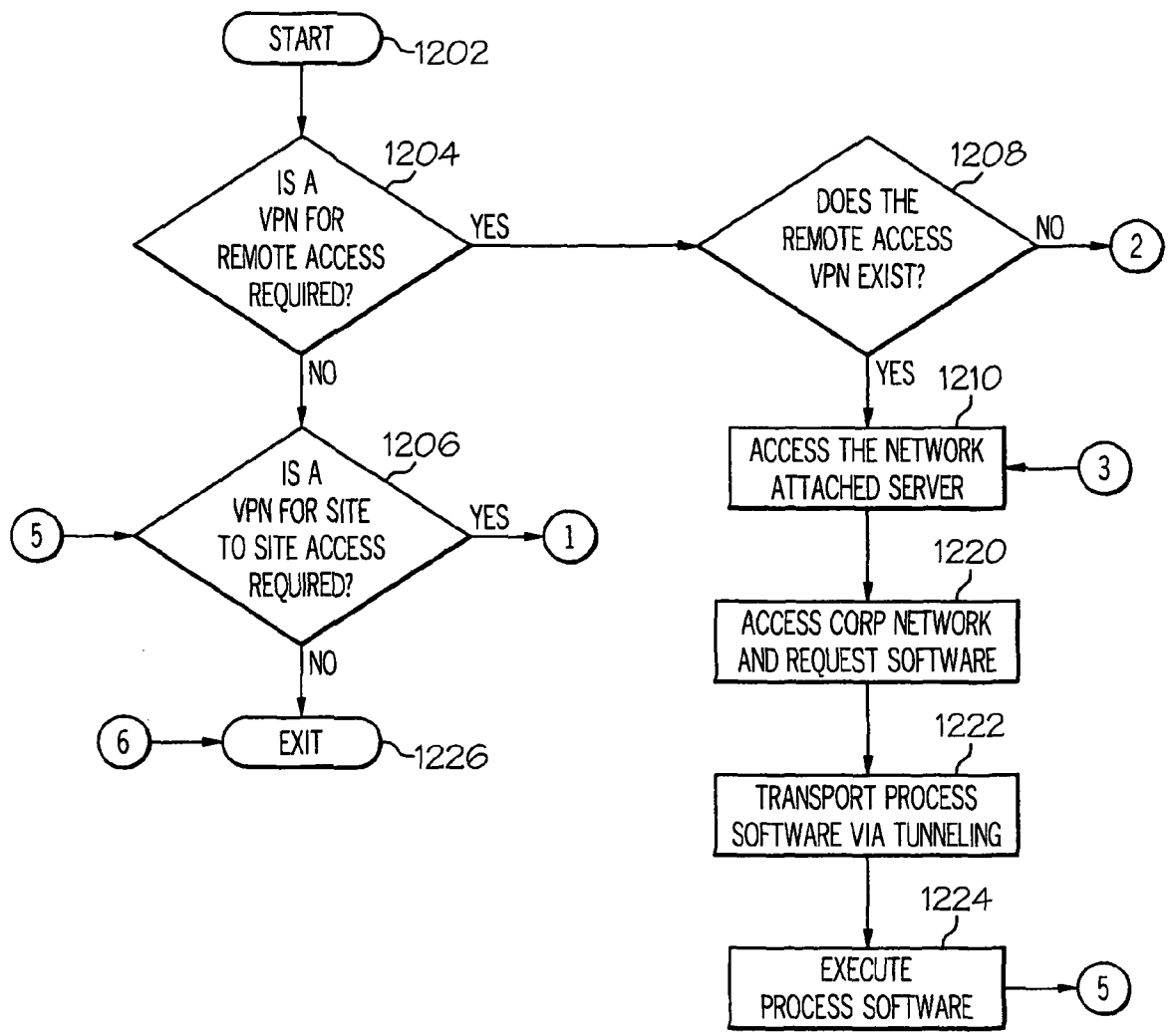
FIGS. 12a-c show a flow-chart of steps taken to deploy in a Virtual Private Network (VPN) software that is capable of executing the steps shown in FIGS. 1-8.
Figure 12B:
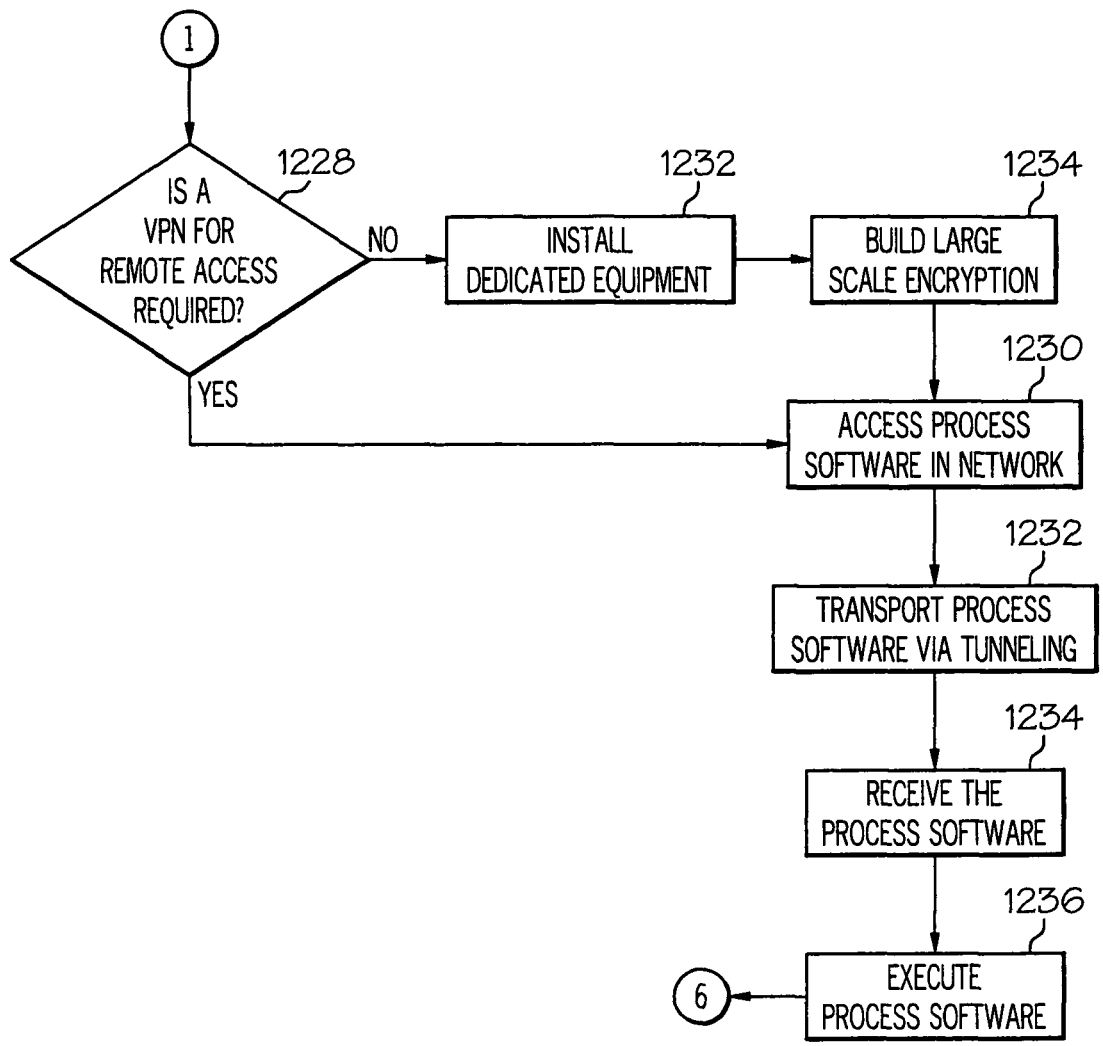
Figure 12C:
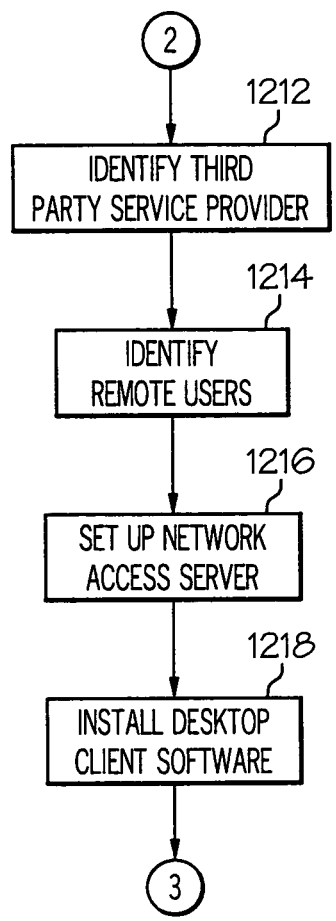

The process for such VPN deployment is described in FIGS. 12a-c. Initiator block 1202 begins the Virtual Private Network (VPN) process. A determination is made to see if a VPN for remote access is required (query block 1204). If it is not required, then proceed to (query block 1206). If it is required, then determine if the remote access VPN exists (query block 1208).

If a VPN does exist, then proceed to block 1210. Otherwise identify a third party provider that will provide the secure, encrypted connections between the company's private network and the company's remote users (block 1212). The company's remote users are identified (block 1214). The third party provider then sets up a network access server (NAS) (block 1216) that allows the remote users to dial a toll free number or attach directly via a broadband modem to access, download and install the desktop client software for the remote-access VPN (block 1218).

After the remote access VPN has been built or if it been previously installed, the remote users can access the process software by dialing into the NAS or attaching directly via a cable or DSL modem into the NAS (block 1210). This allows entry into the corporate network where the process software is accessed (block 1220). The process software is transported to the remote user's desktop over the network via tunneling. That is the process software is divided into packets and each packet including the data and protocol is placed within another packet (block 1222). When the process software arrives at the remote user's desktop, it is removed from the packets, reconstituted and then is executed on the remote users desktop (block 1224).

A determination is then made to see if a VPN for site to site access is required (query block 1206). If it is not required, then proceed to exit the process (terminator block 1226). Otherwise, determine if the site to site VPN exists (query block 1228). If it does exist, then proceed to block 1230. Otherwise, install the dedicated equipment required to establish a site to site VPN (block 1232). Then build the large scale encryption into the VPN (block 1234).

After the site to site VPN has been built or if it had been previously established, the users access the process software via the VPN (block 1230). The process software is transported to the site users over the network via tunneling (block 1232). That is the process software is divided into packets and each packet including the data and protocol is placed within another packet (block 1234). When the process software arrives at the remote user's desktop, it is removed from the packets, reconstituted and is executed on the site users desktop (block 1236). The process then ends at terminator block 1226.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 13A:
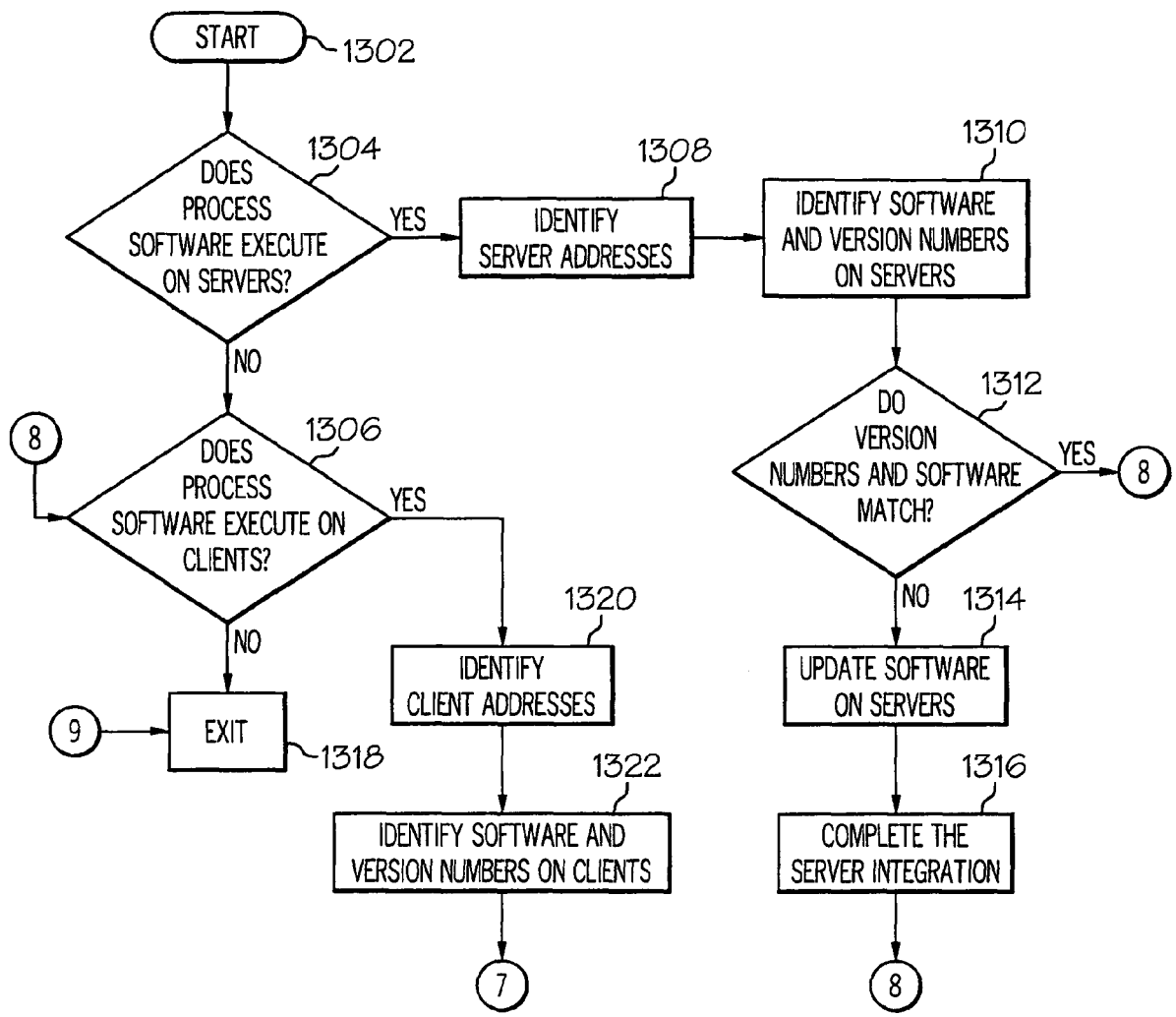
FIGS. 13a-b show a flow-chart showing steps taken to integrate into an computer system software that is capable of executing the steps shown in FIGS. 1-8.
Figure 13B:
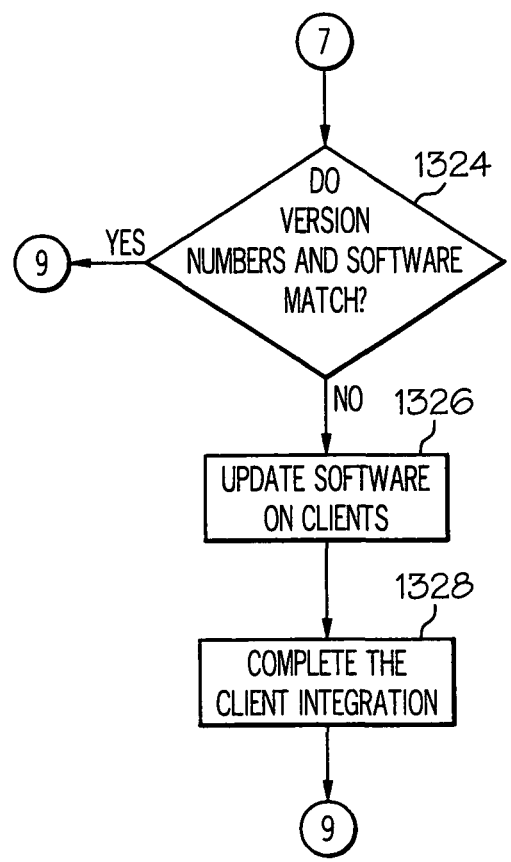

For a high-level description of this process, reference is now made to FIGS. 13*a-b*. Initiator block 1302 begins the integration of the process software. The first thing is to determine if there are any process software programs that will execute on a server or servers (block 1304). If this is not the case, then integration proceeds to query block 1306. If this is the case, then the server addresses are identified (block 1308). The servers are checked to see if they contain software that includes the operating system (OS), applications, and Network Operating Systems (NOS), together with their version numbers, which have been tested with the process software (block 1310). The servers are also checked to determine if there is any missing software that is required by the process software in block 1310.

A determination is made if the version numbers match the version numbers of OS, applications and NOS that have been tested with the process software (block 1312). If all of the versions match and there is no missing required software the integration continues in query block 1306.

If one or more of the version numbers do not match, then the unmatched versions are updated on the server or servers with the correct versions (block 1314). Additionally if there is missing required software, then it is updated on the server or servers in the step shown in block 1314. The server integration is completed by installing the process software (block 1316).

The step shown in query block 1306, which follows either the steps shown in block 1304, 1312 or 1316, determines if there are any programs of the process software that will execute on the clients. If no process software programs execute on the clients the integration proceeds to terminator block 1318 and exits. If this not the case, then the client addresses are identified as shown in block 1320.

The clients are checked to see if they contain software that includes the operating system (OS), applications, and network operating systems (NOS), together with their version numbers, which have been tested with the process software (block 1322). The clients are also checked to determine if there is any missing software that is required by the process software in the step described by block 1322.

A determination is made is the version numbers match the version numbers of OS, applications and NOS that have been tested with the process software (query block 1324). If all of the versions match and there is no missing required software, then the integration proceeds to terminator block 1318 and exits.

If one or more of the version numbers do not match, then the unmatched versions are updated on the clients with the correct versions (block 1326). In addition, if there is missing required software then it is updated on the clients (also block 1326). The client integration is completed by installing the process software on the clients (block 1328). The integration proceeds to terminator block 1318 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 14A:
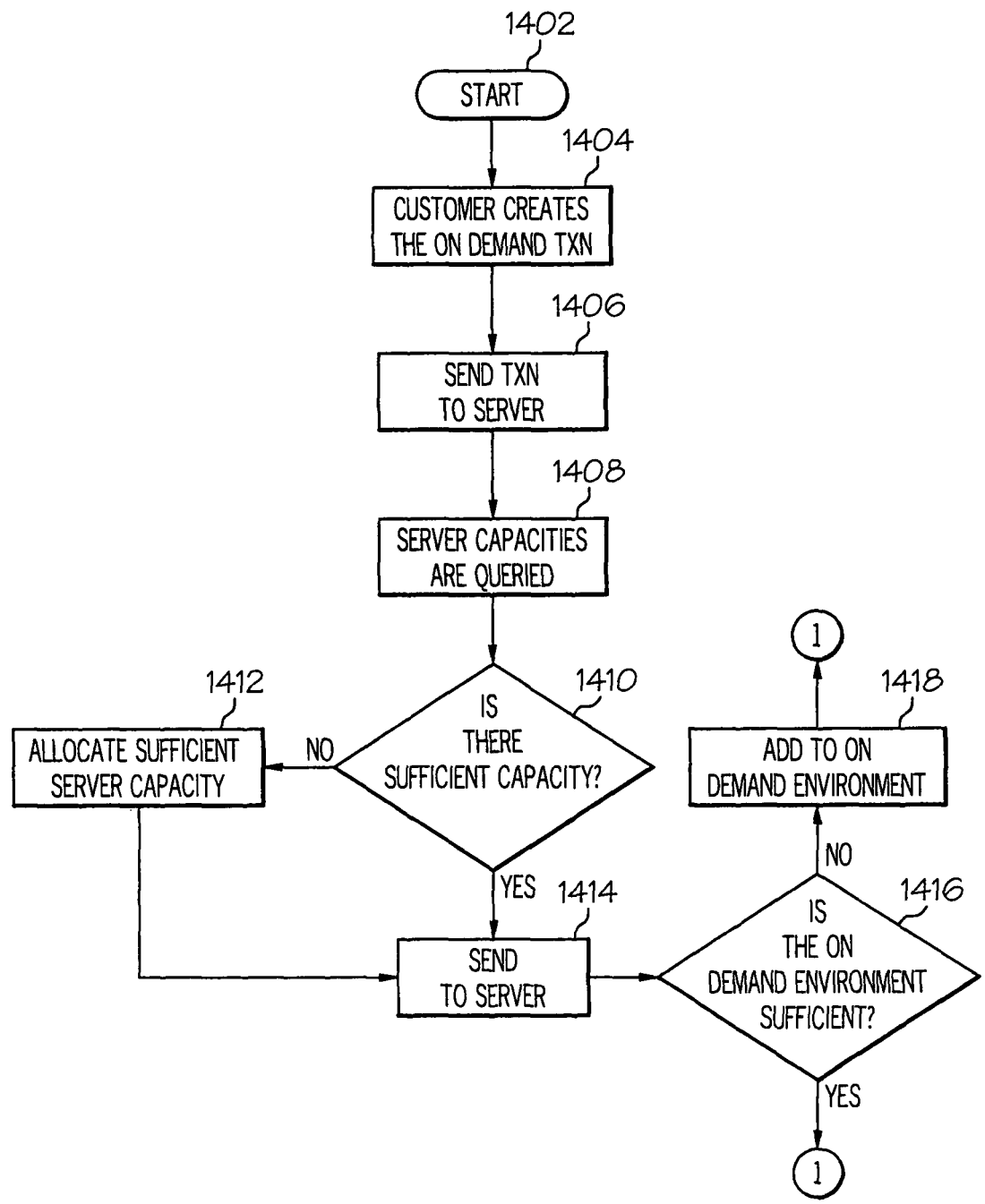
FIGS. 14a-b show a flow-chart showing steps taken to execute the steps shown in FIGS. 1-8 using an on-demand service provider.
Figure 14B:
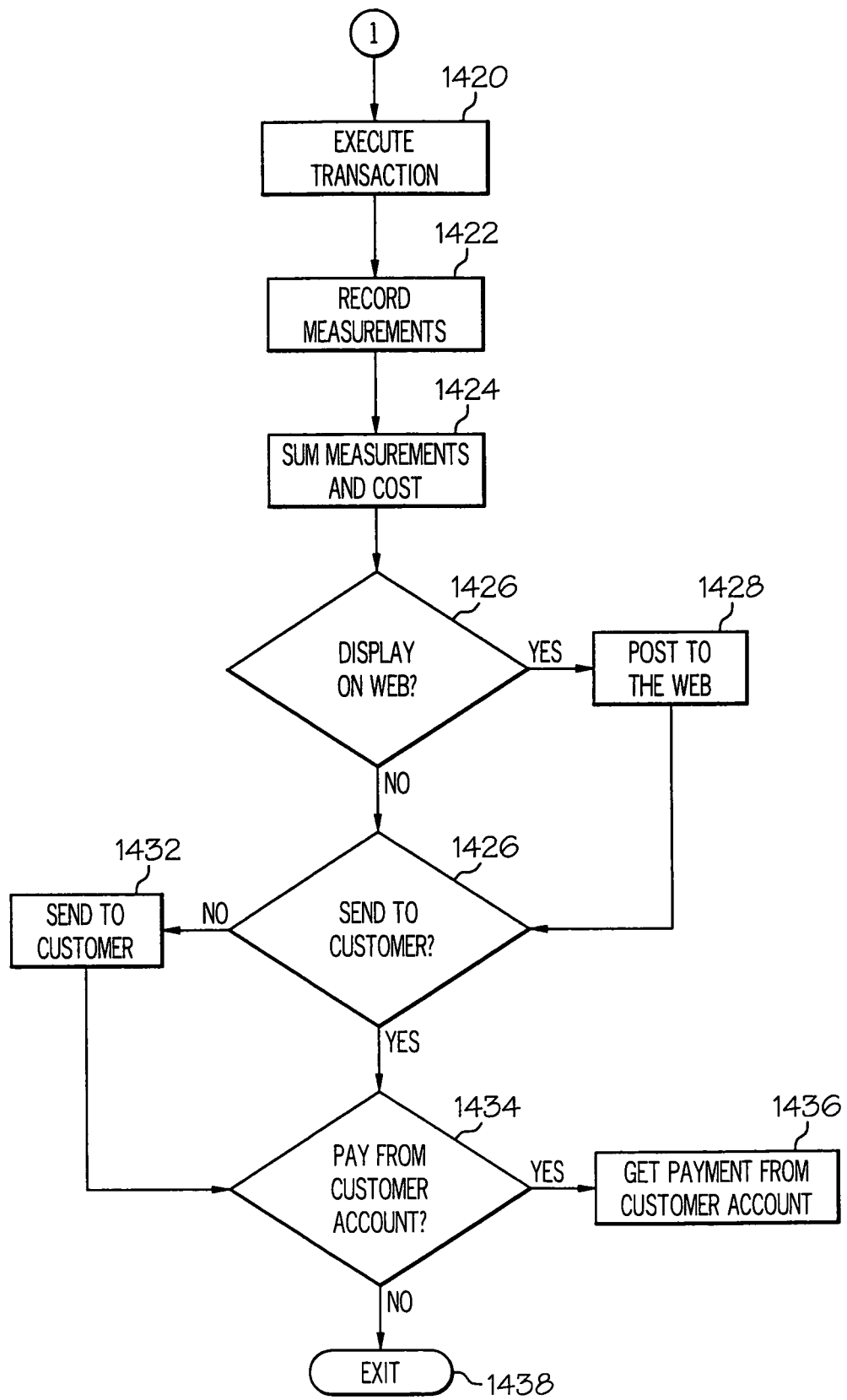

With reference now to FIGS. 14*a-b*, initiator block 1402 begins the On Demand process. A transaction is created than contains the unique customer identification, the requested service type and any service parameters that further specify the type of service (block 1404). The transaction is then sent to the main server (block 1406). In an On Demand environment the main server can initially be the only server, then as capacity is consumed other servers are added to the On Demand environment.

The server central processing unit (CPU) capacities in the On Demand environment are queried (block 1408). The CPU requirement of the transaction is estimated, then the servers available CPU capacity in the On Demand environment are compared to the transaction CPU requirement to see if there is sufficient CPU available capacity in any server to process the transaction (query block 1410). If there is not sufficient server CPU available capacity, then additional server CPU capacity is allocated to process the transaction (block 1412). If there was already sufficient Available CPU capacity then the transaction is sent to a selected server (block 1414).

Before executing the transaction, a check is made of the remaining On Demand environment to determine if the environment has sufficient available capacity for processing the transaction. This environment capacity consists of such things as but not limited to network bandwidth, processor memory, storage etc. (block 1416). If there is not sufficient available capacity, then capacity will be added to the On Demand environment (block 1418). Next the required software to process the transaction is accessed, loaded into memory, then the transaction is executed (block 1420).

The usage measurements are recorded (block 1422). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1424).

If the customer has requested that the On Demand costs be posted to a web site (query block 1426), then they are posted (block 1428). If the customer has requested that the On Demand costs be sent via e-mail to a customer address (query block 1430), then these costs are sent to the customer (block 1432). If the customer has requested that the On Demand costs be paid directly from a customer account (query block 1434), then payment is received directly from the customer account (block 1436). The On Demand process is then exited at terminator block 1438.

While the invention has been particularly shown and described with reference to a preferred embodiment, it will be understood by those skilled in the art that various changes in form and detail may be made therein without departing from the spirit and scope of the invention.

What is claimed is:

1. A method for analyzing an enterprise architecture of an enterprise, the method comprising:
    a data processing system identifying for at least one functional area of an enterprise, major processes and activities and a plurality of information technology (IT) systems that support the at least one functional area, wherein the plurality of IT systems comprise hardware and software, and wherein at least one current IT system and at least one future IT system;
    performing an analysis of the hardware and software of the plurality of IT systems to generate at least one process gap document, wherein the at least one process gap document describes at least one gap that exists between processes of a current state of the at least one current IT system and processes of a future state of the at least one future IT system, wherein performing the analysis further comprises comparing, within the at least one gap: one or more processes that will be removed and one or more processes that will be introduced, and one or more sub-processes that will be removed and one or more sub-processes that will be introduced;
    in response to performing the analysis on the plurality of IT systems to generate the at least one process gap document:
        formulating one or more process projects that are candidates to resolve the at least one gap and which move the plurality of IT systems of the enterprise from the current state to the future state;
        developing a fit gap closure project list that identifies the one or more process projects;

the data processing system assessing, for each of the one or more process projects:
an amount of resources required, a cost, a risk based on one or more other projects, and any low cost changes that can immediately be made to move from the current to the future state, wherein assessing each of the one or more process projects further comprises grouping the one or more process projects into one or more releases; and
the data processing system, based on the assessment, creating a technology roadmap for the enterprise that addresses deficiencies associated with the at least one gap;
the data processing system receiving a Business Architecture Analysis (BAA) that is generated in response to a review of the technology roadmap; and
submitting, using the data processing system, the BAA to the enterprise for implementation.

2. The method of claim 1, wherein:
performing the analysis on the plurality of IT systems to generate at least one process gap document, further comprises:
performing, using the data processing system, a technical analysis on the plurality of IT systems to generate an IT health check document; and
performing, using the data processing system, a high-level gap analysis based on the technical analysis as reflected in the IT health check document; and
the step of identifying major processes and activities further comprises: generating a document describing process gaps according to business processes, activities, and the plurality of IT systems as well as IT systems, data exchange and IT-based services provided by a service that is creating the BAA for the enterprise.

3. The method of claim 2, wherein the step of performing a technical analysis further comprises:
grouping the plurality of IT systems in the enterprise according to Enterprise Resource Planning (ERP), Customer Relationship Management (CRM), Supply Chain Management (SCM), and Financial Management Systems (FMS) categories.

4. The method of claim 1, wherein performing the analysis on the plurality of IT systems to generate at least one process gap document, further comprises:
performing, using the data processing system, a technical analysis on the plurality of IT systems to generate an IT health check document; and
performing, using the data processing system, a high-level gap analysis based on the technical analysis as reflected in the IT health check document, wherein the step of performing a high-level gap analysis further comprises:
creating a shortfall analysis table;
extracting verbatim one or more critical issues from an initial project engagement for the enterprise; and
based on the assessment, creating a critical issues, opportunities and recommendations document that identifies the one or more critical issues, one or more opportunities, and a qualitative improvement associated with one or more recommendations for moving the plurality of IT systems of the enterprise from the current state to the future state.

5. The method of claim 4, wherein the step of developing a fit gap closure project list further comprises:
documenting the one or more critical issues, opportunities, and strategic roadmaps.

6. The method of claim 5, further comprising validating the BAA, wherein validating the BAA further comprises:
evaluating a first technology roadmap;
generating a second technology roadmap based on the evaluating of the first technology roadmap; and
evaluating the second technology roadmap.

7. The method of claim 6, wherein the step of submitting the BAA to the enterprise for implementation further comprises:
creating a final BAA report based on a final BAA document, a final technology roadmap, and a glossary for the final BAA document and the final technology roadmap.

8. The method of claim 1, further comprising:
transmitting a questionnaire to a plurality of systems, the plurality of systems including the plurality of IT systems, the questionnaire including a plurality of questions;
receiving a response to the questionnaire from each IT system of the plurality of IT systems, wherein each response includes an answer to each of the plurality of questions; and
based on the received responses to the questionnaire from each IT system, determining the major processes and activities and the plurality of IT systems of the enterprise.

9. The method of claim 8, wherein the plurality of questions comprise:
a first query for identification of one or more processes, one or more goals, and one or more key entities of the enterprise architecture;
a second query for identification of one or more client devices accessing the one or more IT systems and one or more entities interacting with the enterprise architecture;
a third query for identification of key roles and responsibilities of the enterprise architecture;
a fourth query for identification of whether the a business architecture, application architecture, and a technical architecture of the enterprise architecture have been created;
a fifth query for identification of a primary user group and a primary user type;
a sixth query of identification of language requirements for content of the enterprise and for identification of a particular information that should be made available and a party and method for whom the information should be made available;
a seventh query for identification of interactions between applications, users, and external entities; and
an eighth query for identification of types of content and how the types of content are maintained, published, and distributed.

10. The method of claim 8, wherein the plurality of questions comprise:
ninth query for identification of a currently logical design of databases of the enterprise architecture;
a tenth query for identification of a required infrastructure needed to support one or more service levels;
an eleventh query for identification of security and privacy requirements;
a twelfth query for identification of any ongoing performing planning or capacity planning processes;
a thirteenth query for identification of a baseline for a business volumetric information of the enterprise architecture;

a fourteenth query for identification of one or more tools used in testing of the enterprise architecture and one or more individuals that conduct the testing;

a fifteenth query for identification of a host of the enterprise and an owner of the equipment of the enterprise; and a sixteenth query for identification of a number of access channels per user type and a total number of users.

11. A machine-readable medium having a plurality of instructions, processable by a machine, embodied therein, wherein the machine-readable medium is a non-transitory machine-readable storage medium and the plurality of instructions, when processed by the machine causes the machine to perform a method for analyzing a business architecture for an enterprise, the method comprising:

identifying for at least one functional area of an enterprise, major processes and activities and a plurality of information technology (IT) systems that support the at least one functional area, wherein the plurality of IT systems comprise hardware and software, and wherein at least one current IT system and at least one future IT system;

performing an analysis of the hardware and software of the plurality of IT systems to generate at least one process gap document, wherein the at least one process gap document describes at least one gap that exists between processes of a current state of the at least one current IT system and processes of a future state of the at least one future IT system, wherein performing the analysis further comprises comparing, within the at least one gap: one or more processes that will be removed and one or more processes that will be introduced, and one or more sub-processes that will be removed and one or more sub-processes that will be introduced;

in response to performing the analysis on the plurality of IT systems to generate the at least one process gap document:

formulating one or more process projects that are candidates to resolve the at least one gap and which move the plurality of IT systems of the enterprise from the current state to the future state;

developing a fit gap closure project list that identifies the one or more process projects;

assessing, for each of the one or more process projects: an amount of resources required, a cost, a risk based on one or more other projects, and any low cost changes that can immediately be made to move from the current to the future state, wherein assessing each of the one or more process projects further comprises grouping the one or more process projects into one or more releases; and based on the assessment, creating a technology roadmap for the enterprise that addresses deficiencies associated with the at least one gap;

receiving a Business Architecture Analysis (BAA) that is generated in response to a review of the technology roadmap; and submitting the BAA to the enterprise for implementation.

12. The machine-readable medium of claim 11, wherein:
performing the analysis on the plurality of IT systems to generate at least one process gap document, further comprises:

performing a technical analysis on the plurality of IT systems to generate an IT health check document; and performing a high-level gap analysis based on the technical analysis as reflected in the IT health check document; and the step of identifying major processes and activities further comprises: generating a document describing process gaps according to business processes, activities, and Information Technology (IT) systems of the enterprise as well as IT systems, data exchange and IT-based services provided by a service that is creating the BAA for the enterprise.

13. The machine-readable medium of claim 12, wherein the step of performing a technical analysis further comprises:

grouping the plurality of IT systems in the enterprise according to Enterprise Resource Planning (ERP), Customer Relationship Management (CRM), Supply Chain Management (SCM), and Financial Management Systems (FMS) categories.

14. The machine-readable medium of claim 11, wherein performing the analysis on the plurality of IT systems to generate at least one process gap document, further comprises:

performing, using the data processing system, a technical analysis on the plurality of IT systems to generate an IT health check document; and performing, using the data processing system, a high-level gap analysis based on the technical analysis as reflected in the IT health check document, wherein the step of performing a high-level gap analysis further comprises:

creating a shortfall analysis table;

extracting verbatim one or more critical issues from an initial project engagement for the enterprise; and based on the assessment, creating a critical issues, opportunities and recommendations document that identifies the one or more critical issues, one or more opportunities, and a qualitative improvement associated with one or more recommendations for moving the plurality of IT systems of the enterprise from the current state to the future state.

15. The machine-readable medium of claim 14, wherein:
the step of developing a fit gap closure project list further comprises:

documenting the one or more critical issues, one or more opportunities, and one or more strategic roadmaps;

the step of validating the BAA further comprises:
evaluating a first technology roadmap;
generating a second technology roadmap based on the evaluating of the first technology roadmap; and
evaluating the second technology roadmap;

the step of submitting the BAA to the enterprise for implementation further comprises: creating a final BAA report based on a final BAA document, a final technology roadmap, and a glossary for the final BAA document and the final technology roadmap.

16. The machine-readable medium of claim 11, wherein the processable instructions are deployed to a server from a remote location.

17. The machine-readable medium of claim 11, wherein the processable instructions are provided by a service provider to a customer on an on-demand basis.

18. The machine-readable medium of claim 11, the plurality of instructions further comprising instructions for:

transmitting a questionnaire to a plurality of systems, the plurality of systems including the plurality of IT systems, the questionnaire including a plurality of questions;

receiving a response to the questionnaire from each IT system of the plurality of IT systems, wherein each response includes an answer to each of the plurality of questions; and based on the received responses to the questionnaire from each IT system, determining the major processes and activities and the plurality of IT systems of the enterprise.

19. The machine-readable medium of claim 18, wherein the plurality of questions comprise:
- a first query for identification of one or more processes, one or more goals, and one or more key entities of the enterprise architecture;
- a second query for identification of one or more client devices accessing the one or more IT systems and one or more entities interacting with the enterprise architecture;
- a third query for identification of key roles and responsibilities of the enterprise architecture;
- a fourth query for identification of whether the a business architecture, application architecture, and a technical architecture of the enterprise architecture have been created;
- a fifth query for identification of a primary user group and a primary user type;
- a sixth query of identification of language requirements for content of the enterprise and for identification of a particular information that should be made available and a party and method for whom the information should be made available;
- a seventh query for identification of interactions between applications, users, and external entities; and
- an eighth query for identification of types of content and how the types of content are maintained, published, and distributed.

20. The machine-readable medium of claim 18, wherein the plurality of questions comprise:
- a ninth query for identification of a currently logical design of databases of the enterprise architecture;
- a tenth query for identification of a required infrastructure needed to support one or more service levels;
- an eleventh query for identification of security and privacy requirements;
- a twelfth query for identification of any ongoing performing planning or capacity planning processes;
- a thirteenth query for identification of a baseline for a business volumetric information of the enterprise architecture;
- a fourteenth query for identification of one or more tools used in testing of the enterprise architecture and one or more individuals that conduct the testing;
- a fifteenth query for identification of a host of the enterprise and an owner of the equipment of the enterprise; and
- a sixteenth query for identification of a number of access channels per user type and a total number of users.

* * * * *